US007711140B2

(12) United States Patent
Long et al.

(10) Patent No.: US 7,711,140 B2

(45) Date of Patent: May 4, 2010

(54) SECURE RECORDED DOCUMENTS

(75) Inventors: Timothy Merrick Long, Lindfield (AU); Peter Alleine Fletcher, Rozelle (AU); Stephen James Hardy, West Pymble (AU)

(73) Assignee: Canon Kabushiki Kaisha, Tokyo (JP)

( * ) Notice: Subject to any disclaimer, the term of this patent is extended or adjusted under 35 U.S.C. 154(b) by 1415 days.

(21) Appl. No.: 11/108,712

(22) Filed: Apr. 19, 2005

(65) Prior Publication Data

US 2005/0242568 A1 Nov. 3, 2005

(30) Foreign Application Priority Data

Apr. 21, 2004 (AU) .............................. 2004902153

(51) Int. Cl.
*G06K 9/00* (2006.01)

(52) U.S. Cl. ..................... 382/100; 358/1.14; 358/3.28; 380/54; 380/55; 382/181

(58) Field of Classification Search ................ 358/1.14, 358/3.28; 380/54, 55; 382/100, 137, 176, 382/232

See application file for complete search history.

(56) References Cited

U.S. PATENT DOCUMENTS 5,291,243 A 3/1994 Heckman et al.
5,509,692 A 4/1996 Oz
5,875,249 A * 2/1999 Mintzer et al. ................ 380/54
6,167,147 A 12/2000 Mowry, Jr. et al.
6,285,775 B1 * 9/2001 Wu et al. .................... 382/100
6,366,696 B1 4/2002 Hertz et al.
6,389,151 B1 * 5/2002 Carr et al. ................... 382/100
6,457,651 B2 10/2002 Paul et al.
6,694,041 B1 2/2004 Brunk
7,085,399 B2 * 8/2006 Suzaki ....................... 382/100
7,104,709 B1 * 9/2006 Maher et al. .................. 400/76
7,231,082 B2 * 6/2007 Lenoir ........................ 382/154
7,245,740 B2 * 7/2007 Suzaki ....................... 382/100
7,343,025 B2 * 3/2008 Seo et al. .................... 382/100
2002/0085735 A1 7/2002 Fletcher et al. ............. 382/100
2003/0012406 A1 1/2003 Iwamura
2003/0123660 A1 7/2003 Fletcher et al. ............. 380/205
2003/0231786 A1 12/2003 Iwamura et al. ............. 382/100
2004/0038756 A1 * 2/2004 Brophy ....................... 473/451
2004/0086197 A1 5/2004 Fletcher et al. ............. 382/276
2004/0158724 A1 * 8/2004 Carr et al. ................... 713/186
2005/0129270 A1 * 6/2005 Prakash ...................... 382/100

* cited by examiner

*Primary Examiner*—Gregory M Desire
(74) *Attorney, Agent, or Firm*—Fitzpatrick, Cella, Harper & Scinto

(57) ABSTRACT

An anti-tampering method for processing documents is disclosed. The method comprises, in regard to an encoding step, the steps of resolving (in a step 2303) in regard to an N-level image to be recorded, a pixel of the image into a major component having N possible values, selecting (in the step 2303) a pattern element depending upon the major component and the position of the pixel in the image, and recording the selected pattern element (in a step 2308) onto a transfer medium. In regard to a corresponding decoding step the method comprises extracting (in a step 2405) from the recorded document, a retrieved pattern element for said pixel, determining a pattern element (in a step 2407) depending upon a major component extracted from the retrieved pattern element and the position of the pixel on the recorded document, and comparing (in a step 2409) the retrieved pattern element and the said determined pattern element.

29 Claims, 19 Drawing Sheets

SECURE RECORDED DOCUMENTS

FIELD OF THE INVENTION

The current invention relates to production and processing of recorded documents, and in particular, to the production of tamper evident documents and detection of tampering in such documents. The description is directed primarily, for ease and consistency of description, to printed documents, however the disclosed method can be equally applied to other forms of documents upon which information is recorded.

BACKGROUND

It is often desirable to ensure that a printed document has not been altered in some unauthorised manner from the time it was first produced. For example, a contract that has been agreed upon and signed on some date may subsequently be fraudulently altered. It is desirable to be able to detect such alterations in detail. Similarly, security documents of various sorts including cheques and monetary instruments record values that are vulnerable to fraudulent alteration. Detection of any fraudulent alteration is desirable. Further, it is desirable that such detection be performed automatically, and that the detection reveal the exact nature of the alteration. In addition to detection of fraudulent tampering with a document, it is desirable that such documents offer a visible deterrent to fraudulent alteration.

Various methods of deterring and detecting fraudulent alteration to documents have been proposed and used.

One class of methods in use before high quality colour scanners and printers became commonly available was to print important information such as monetary amounts in special fonts or with special shadows that were, at the time, difficult to reproduce. However, with modem printers and scanners, such techniques have become vulnerable to attack.

One known method of detecting alteration uses a 2D barcode printed on one part of a document page to encode (possibly cryptographically) a representation of some other portion, such as a signature area. This 2D barcode can be decoded and the resulting image compared by an operator to the area it is intending to represent to check for similarity.

A related body of work is the detection of tampering in digital images that are not subject to print/scan cycles. A number of "fragile watermark" techniques are known in this field, however these techniques are generally not applicable to tamper detection in printed documents because they cannot withstand the introduction of noise, Rotation, Scaling and Translation (RST), re-sampling, and local distortion that occurs in a print/scan cycle. Some of these techniques operate by replacing all or some of the least significant bits of pixels of an image with some form of checksum of remaining bits in each pixel.

A number of "semi-fragile" systems have also been described. These include systems that use cross-correlation to detect the presence of a lightly embedded shifted copy of a portion of the image. Another technique is to embed watermarks into image blocks, and then compare the detection strength of these watermarks to discern if any blocks have been altered. These systems tend to have less localisation ability as their detection ability improves, and as their localisation ability improves, they become more sensitive to noise and other distortions and so cannot be used to detect local changes in printed documents.

Other techniques use special materials to make alteration difficult. Such techniques include laminates covering the printed surface where damage to the laminate is obvious. However using special materials introduces production complexity, and is not applicable to plain paper applications. They are also not amenable to automatic detection.

An additional failing in many existing techniques is weak cryptographic security. In many cases, once the cryptographic algorithm being employed is identified, the identification leads directly to a subversion method to attack the identified method.

Another common failing of present techniques is the distribution of alteration detection information over wide areas of the page, or even areas completely separate to the image area to be authenticated (as in the barcode method above). This introduces problems if there is incidental soiling of the document in areas apart from the image area being authenticated. Many of these techniques cannot be used to authenticate the entire area of a document, so documents must be specifically designed to accommodate them.

A further class of techniques uses independent transfer of information about the original unaltered form of the document to the verification process. This could be as simple as a telephone call to a person with independent knowledge, and may extend to keeping a complete copy of the document in a secure location. Such techniques have many practical disadvantages because they require handling and storage of such independent information.

SUMMARY

It is an object of the present invention to substantially overcome, or at least ameliorate, one or more disadvantages of existing arrangements.

Disclosed are arrangements, referred to generally as the "anti-tampering approach", which seek to address the above problems by printing (if this form of recording information is used), on the printed document, a processed form of the information which is desired to be printed (which is referred to as the "source" information). The aforementioned processing produces a printed, visually perturbed, form of the source information. The perturbation is such that the printed perturbed information retains sufficient fidelity, relative to the source information, to enable the source information to be read from the printed document by a person, or by machine means (using video-detection and processing for example). The "perturbations", however, are spatially keyed to the source information, so that the source information establishes the specifics of the perturbation at each region of the printed document.

Although this description is directed primarily, for ease and consistency of description, to application of the disclosed anti-tampering approach to printed documents, the method can be equally applied to other forms of documents upon which information is recorded. Thus, for example, the anti-tampering approach can be applied to documents comprising photographic film (eg silver halide) upon which information is recorded optically.

The processing of the source information to form the perturbed information uses a cryptographically secure key. Without knowledge of this key, tampering with the printed document will generally not, in the region of the tampering, produce the "correct" perturbation components. In order to verify the tamper-status of the printed document, the authorised reader of the printed document firstly extracts, either visually or using video processing, the purported source information. The user then uses his or her knowledge of the cryptographic code to re-create the perturbations on the document. In the region where tampering has taken place, this re-creation will produce perturbations associated with the tampered information. These perturbations however will not be correct, to a predefined level of confidence, because the tamperer would have been cryptographically prevented from correctly creating the correct perturbations.

The anti-tampering approach requires the tamper-evident document to be precisely aligned with (reproductions of) cryptographic fields that were originally used to produce the tamper-evident document. The fields are cryptographic in the sense that they are based on a secret (in this case, a key). The fields have the property that it is impractical to completely generate them without knowledge of the key, even if a fragment of the field is known. According to one arrangement, and provided that the tamper-evident document has not been distorted relative to the cryptographic fields, simple registration points can be incorporated into the tamper-evident document. These registration points can be used to obtain precise alignment between the tamper-evident document and the cryptographic fields used for validation. From an implementation perspective the registration points can be detected by a scanner 2218 (see FIG. 1) when a tamper-evident document 105 is scanned as described in relation to FIG. 2. The coarse alignment step is optional. In many applications, in particular when the tampering is only to be detected in a small field of a document, other coarse alignment methods can be used. In some instances, even manual coarse alignment can be utilised. In another arrangement, that is more robust in the face of document distortion caused by the scan/print cycle, distributed "coarse" and "fine" alignment information is embedded into the tamper-evident document, and later used to achieve the alignment when validating the tamper-evident document.

According to a first aspect of the present invention, there is provided a method for processing a tamper-evident document, the method comprising the steps of:

(a) resolving, in regard to an N-level image to be recorded, at least one pixel of the image into a major component having N possible values, (b) selecting a pattern element from at least one predetermined pattern, said selection depending upon (ai) the major component and (aii) the position of the at least one pixel in the image;

(c) recording the selected pattern element for said at least one pixel onto a transfer medium;

(d) extracting, from the recorded document, a retrieved pattern element for said at least one pixel;

(e) determining a pattern element depending upon (di) a major component extracted from said retrieved pattern element and (dii) the position of the at least one pixel on the recorded document; and (f) comparing the said retrieved pattern element and the said determined pattern element.

According to another aspect of the present invention, there is provided a method for processing a tamper-evident document, the method comprising the steps of:

(a) resolving, in regard to an N-level image to be recorded, at least one pixel of the image into a major component having N possible values, and a corresponding randomised minor component, said randomised minor component depending upon (ai) the major component and (aii) a position of the at least one pixel in the image;

(b) recording the major component and the randomised minor component for said at least one pixel onto a transfer medium;

(c) extracting, from the recorded document, the major component for said at least one pixel;

(d) determining the corresponding randomised minor component depending upon (di) the extracted major component and (dii) a position of the at least one pixel on the recorded document;

(e) measuring, from the printed document, the printed randomised minor component for said at least one pixel; and (f) declaring that the pixel of the printed document has been tampered with if the measured printed randomised minor component does not match the determined randomised minor component.

According to another aspect of the present invention, there is provided a method for recording a tamper-evident document, the method comprising the steps of:

(a) resolving, in regard to an N-level image to be recorded, at least one pixel of the image into a major component having N possible values, (b) selecting a pattern element from at least one predetermined pattern, said pattern element depending upon (bi) the major component, and (bii) the position of the at least one pixel in the image; and (c) recording the pattern element for said at least one pixel onto a transfer medium.

According to another aspect of the present invention, there is provided a method for recording a tamper-evident document, the method comprising the steps of:

(a) resolving, in regard to an N-level image to be recorded, at least one pixel of the image into a major component having N possible values, and a corresponding randomised minor component, said randomised minor component depending upon (ai) the major component, and (aii) a position of the at least one pixel in the image; and (b) recording the major component and the randomised minor component for said at least one pixel onto a transfer medium.

According to another aspect of the present invention, there is provided a method for validating a recorded tamper-evident document, the method comprising the steps of:

(a) extracting, from a position in the recorded document, a retrieved pattern element;

(b) selecting a pattern element depending upon (bi) a characteristic of the said retrieved pattern element and (bii) the position;

(c) comparing the retrieved pattern element and the selected pattern element.

According to another aspect of the present invention, there is provided a method for validating a recorded tamper-evident document, the method comprising the steps of:

(a) extracting, from the recorded document, a major component, having N possible values, for at least one recorded pixel;

(b) determining a corresponding randomised minor component depending upon (bi) the extracted major component and (bii) a position of the at least one recorded pixel;

(c) measuring, from the recorded document, the recorded randomised minor component for said at least one pixel; and (d) comparing the measured recorded randomised minor component and the determined randomised minor component.

According to another aspect of the present invention, there is provided a tamper-evident document upon which is recorded an N-level image, the document comprising, in regard to at least one pixel of the image, a recorded pattern element that visually approximates the level of said pixel and also has a cryptographic value depending upon (a) the level of said pixel, and (b) the position of said pixel in the recorded document.

According to another aspect of the present invention, there is provided a tamper-evident document upon which is recorded an N-level image, the document comprising, in regard to at least one recorded pixel of the image, a recorded major component having N possible values, and a recorded randomised minor component, said recorded randomised minor component depending upon (a) the major component, and (b) a position of the at least one recorded pixel in the recorded document.

According to another aspect of the present invention, there is provided a computer program product having a computer readable medium having a computer program recorded therein for directing a processor to execute any of the above methods.

According to another aspect of the present invention, there is provided a computer program for directing a processor to execute any of the above methods.

According to another aspect of the present invention, there is provided a method of detecting tampering of a security document, comprising:

(a) generating scan data corresponding to said document;

(b) performing region matching between said scan data and at least one two-dimensional cryptographic field to obtain alignment information;

(c) using said alignment information and said scan data to detect tampering in said security document.

According to another aspect of the present invention, there is provided a method of detecting tampering in a recorded image, said method including the steps of:

(a) combining an image with at least one two-dimensional cryptographic signal to form a second image, (b) recorded said second image to form a recorded image, (c) processing said recorded image to make a retrieved image, (d) detecting alignment of said retrieved image with respect to said at least one two-dimensional cryptographic signal, and (e) using said alignment and said retrieved image and the said at least one cryptographic signal to detect tampering.

According to another aspect of the present invention, there is provided an apparatus for producing a security document, said apparatus comprising:

(a) a retrieving element for retrieving an original document and producing a document image (b) a marking element for marking said document image with a security pattern to produce a marked document image, and (c) a recording element for recording said marked document image to produce a security document, wherein said security document is a readable rendition of said original document and said security pattern provides for detection of alteration between said original document and said security document.

According to another aspect of the present invention, there is provided an apparatus for revealing alterations between an altered recorded document and an unaltered form, said apparatus being characterised by:

(a) a retrieval means to produce retrieved data corresponding to said recorded document, (b) a means to determine the alteration of the shape of at least one graphic element between its shape in the retrieved data and its shape in the unaltered form, said means being blind to the unaltered form, (c) a means to output the determined alteration in the shape.

Other aspects of the invention are also disclosed.

BRIEF DESCRIPTION OF THE DRAWINGS

One or more embodiments of the present invention will now be described with reference to the drawings, in which:

FIG. 4 shows a process, using the system of FIG. 2, for validating the tamper-evident document from FIG. 3, ie for determining whether the document has been tampered with;

DETAILED DESCRIPTION INCLUDING BEST MODE

Figure 1:
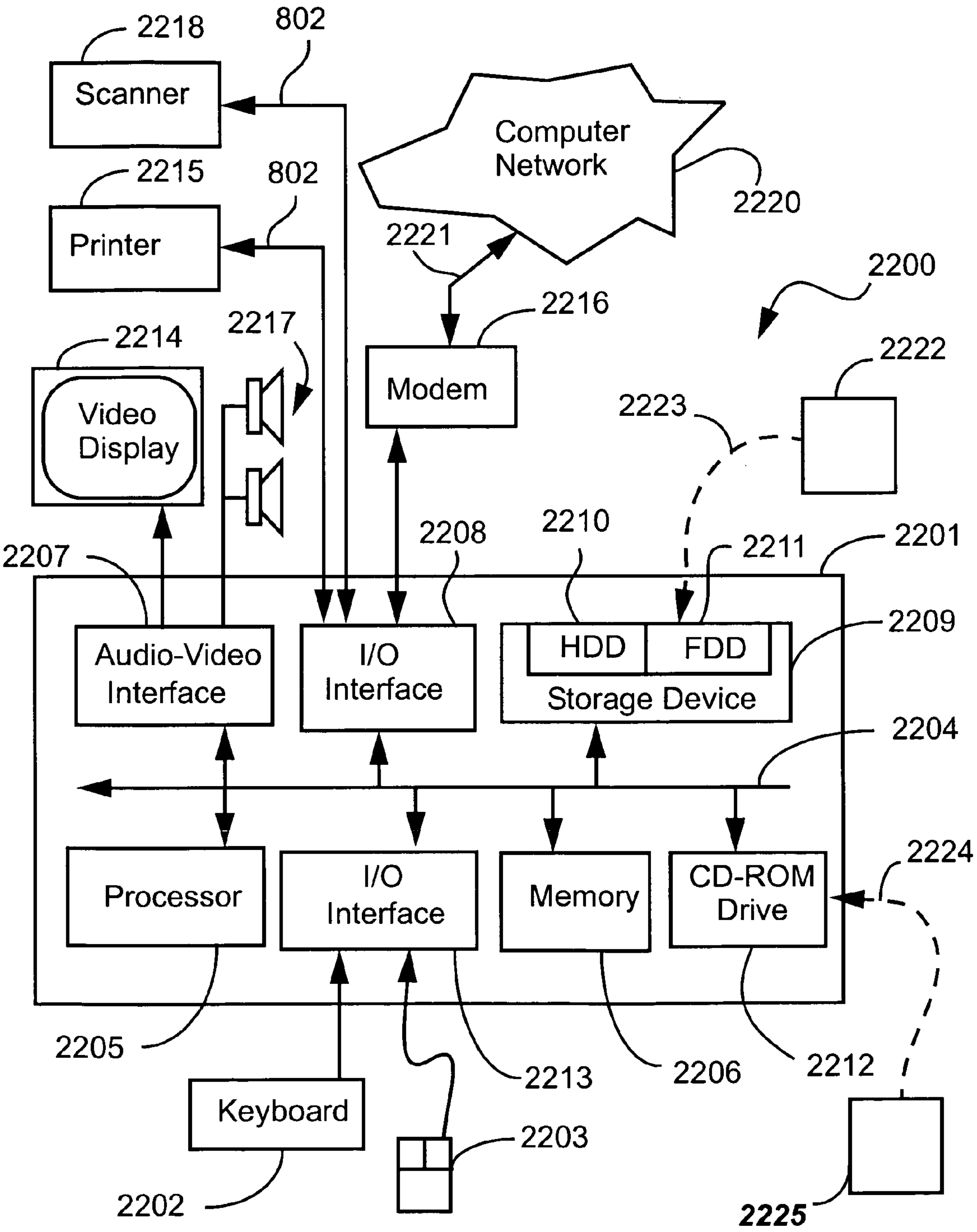
FIG. 1 is a schematic block diagram of a general purpose computer upon which the anti-tampering arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices that form public knowledge through their respective publication and/or use. Such should not be interpreted as a representation by the present inventor(s) or patent applicant that such documents or devices in any way form part of the common general knowledge in the art.

The disclosed "anti-tampering approach" allows an original black and white document to be printed (or re-printed) with a special security marking. Although the description is directed to bi-level (eg black and white) documents, the disclosed anti-tampering approach can be used on multi-level documents using, for example, black, grey and white source information. Alternately, by using dithering or half toning grey levels may be represented using black and white pixels. The resulting "tamper-evident" document can be recognised and read directly by a human, and can also be scanned and analysed to detect whether any tampering (such as alteration) has taken place. Detailed and localised differences between what is visible to a human reader on the printed document and the original document can be revealed, even in the presence of minor damage to the printed document, such as noise, fading, physical distortion, and the many changes introduced by the print/scan process. No knowledge of the original source information is required for this validation process as applied to the tamper-evident document. Because the revelation of the differences is detailed and localised, a person viewing the revealed differences can easily distinguish important alterations, such as an altered monetary amount, from unimportant ones, such as a stain or accidental pen mark. The process is cryptographically secure, to a predefined confidence level, against "man in the middle" attacks. A man in the middle attack is a term used in cryptography to describe an attack made by a malicious intermediary not in possession of the key.

The validation analysis only requires access to the physical (printed) tamper-evident document and a common private key. In the preferred arrangement this common private key can be the same for many documents without challenging the cryptographic safety of the system. In particular, the method does not become vulnerable to attacks based on knowledge of different pages marked with the same key.

Some portions of the description that follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification, discussions utilizing terms such as "scanning", "calculating", "determining", "replacing", "generating" "initializing", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the disclosed arrangements also implicitly disclose one or more computer program modules, in that it would be apparent to the person skilled in the art that the individual steps of the methods described herein are to be put into effect by computer code module(s). The computer program(s) are not intended to be limited to any particular programming language and implementation thereof. It will be appreciated that a variety of programming languages and coding thereof may be used to implement the teachings of the disclosure contained herein. Moreover, the computer program(s) are not intended to be limited to any particular control flow. There are many other variants of the computer program(s), which can use different control flows without departing the spirit or scope of the disclosed arrangement. Furthermore one or more of the steps of the computer program(s) may be performed in parallel rather than sequentially.

Such computer program(s) may be stored on any computer readable medium(s). The computer readable medium(s) may include storage devices such as magnetic or optical disks, memory chips, or other storage devices suitable for interfacing with one or more general purpose computers. The computer readable medium(s) may also include hard-wired medium(s) such as exemplified in the Internet system, or wireless medium such as exemplified in the GSM mobile telephone system. The computer program module(s) when loaded and executed on such a general-purpose computer effectively result in an apparatus that implements the steps of the preferred method.

FIG. 1 is a schematic block diagram of a general purpose computer upon which the anti-tampering arrangements described can be practiced. The method of anti-tampering is preferably practiced using a general-purpose computer system 2200, such as that shown in FIG. 1 wherein the processes of FIGS. 3-4, 6-7, 12-15 and 17-18 may be implemented as software, such as an anti-tampering application program executing within the computer system 2200. In particular, the steps of method of anti-tampering are effected by instructions in the anti-tampering application software that are carried out by the computer. The instructions may be formed as one or more code modules, each for performing one or more particular tasks. The anti-tampering application software may also be divided into two separate parts, in which a first part performs the anti-tampering methods and a second part manages a user interface between the first part and the user. The anti-tampering application software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for anti-tampering.

The computer system 2200 is formed by a computer module 2201, input devices such as a keyboard 2202, mouse 2203, and scanner 2218, output devices including a printer 2215, a display device 2214 and loudspeakers 2217. A Modulator-Demodulator (Modem) transceiver device 2216 is used by the computer module 2201 for communicating to and from a communications network 2220, for example connectable via a telephone line 2221 or other functional medium. The modem 2216 can be used to obtain access to the Internet, and other network systems, such as a Local Area Network (LAN) or a Wide Area Network (WAN), and may be incorporated into the computer module 2201 in some implementations.

The computer module 2201 typically includes at least one processor unit 2205, and a memory unit 2206, for example formed from semiconductor random access memory (RAM) and read only memory (ROM). The module 2201 also includes an number of input/output (I/O) interfaces including an audio-video interface 2207 that couples to the video display 2214 and loudspeakers 2217, an I/O interface 2213 for the keyboard 2202 and mouse 2203 and optionally a joystick (not illustrated), and an interface 2208 for the modem 2216, the scanner 2218 and the printer 2215. In some implementations, the modem 2216 may be incorporated within the computer module 2201, for example within the interface 2208. A storage device 2209 is provided and typically includes a hard disk drive 2210 and a floppy disk drive 2211. A magnetic tape drive (not illustrated) may also be used. A CD-ROM drive 2212 is typically provided as a non-volatile source of data.

The components 2205-2213 of the computer module 2201, typically communicate via an interconnected bus 2204 and in a manner which results in a conventional mode of operation of the computer system 2200 known to those in the relevant art. Examples of computers on which the described arrangements can be practised include IBM-PC's and compatibles, Sun Sparcstations or like computer systems evolved therefrom.

Typically, the anti-tampering application program is resident on the hard disk drive 2210 and read and controlled in its execution by the processor 2205. Intermediate storage of the program and any data fetched from the network 2220 may be accomplished using the semiconductor memory 2206, possibly in concert with the hard disk drive 2210. In some instances, the anti-tampering application program may be supplied to the user encoded on a CD-ROM 2225 or a floppy disk 2222 and read via the corresponding drive 2212 or 2211 as depicted by respective dashed lines 2224 and 2223. Alternatively the anti-tampering application program may be read by the user from the network 2220 via the modem device 2216. Still further, the anti-tampering application software can also be loaded into the computer system 2200 from other computer readable media. The term "computer readable medium" as used herein refers to any storage or transmission medium that participates in providing instructions and/or data to the computer system 2200 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 2201. Examples of transmission media include radio or infra-red transmission channels as well as a network connection to another computer or networked device, and the Internet or Intranets including e-mail transmissions and information recorded on Websites and the like.

The preferred arrangement of the anti-tampering technique is implemented as software module(s) executing on a general purpose computer system such as 2200. It may, however, also be implemented as anti-tampering application software modules in an embedded system such as a multi-function copier. It may also be implemented by fixed or programmable solid-state logic such as an Application Specific Integrated Circuit or a Field Programmable Gate Array.

Figure 2:
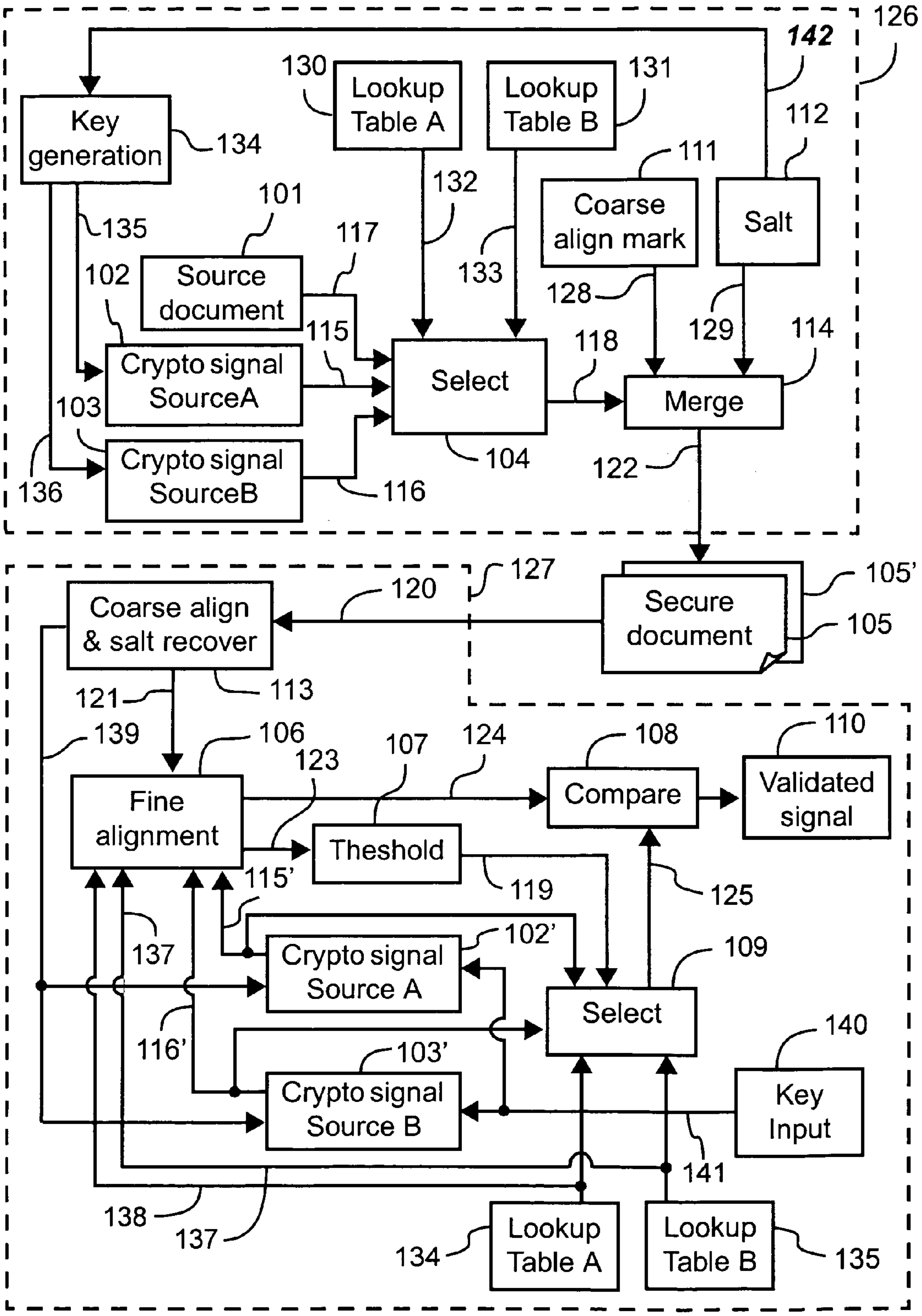
FIG. 2 shows one example of a functional block diagram for the disclosed anti-tampering system.

FIG. 2 shows one example of a functional block diagram for the disclosed anti-tampering system. FIG. 2 comprises a production sub-system 126 for producing tamper-evident documents 105, 105', and a validation sub-system 127 for detecting (validating) whether the tamper-evident documents 105, 105' have been tampered with.

Considering the production sub-system 126 that produces the tamper-evident document 105, a selection module 104 makes a selection from one of two synchronised cryptographic signals 115, 116, depending on the value of a scan-based bi-level source signal 117. The signal 117 is the source information to be printed, and is derived from a bi-level source image 101. The cryptographic signals 115, 116 are stream ciphers generated by respective cryptographic signal sources 102, 103 that receive private key based information as depicted by respective arrows 135, 136 from a key generation module 134. The operation of the key generation module 134 and the cryptographic signal sources 102 and 103 is described further in regard to FIG. 6. If the source document 101 is in paper document form, then the signal 117 can be produced from the paper document 101 using the scanner 2218 (see FIG. 1). If the source document is in electronic document format (such as Adobe PDF), the signal 117 can be produced from a Raster Image Processor (RIP) that converts the electronic document to pixels that form the signal 117. Alternately, if the source image 101 is stored in digital image form in a memory (not shown), then the signal 117 can be read from the memory in a scan-based fashion.

The source signal 117 is used to select between the cryptographic signals 115, 116 to form, in conjunction with respective lookup tables 130, 131, a modulated composite cryptographic signal 118, this being a visually perturbed version of the source information 101. The source image 101, in the present example, is a bi-level image composed of black and white pixels. According to one arrangement, the composite signal 118 represents a multi-level image composed of "dark" and "light" pixels. The dark pixels may thus be, in one example, one of black and fully saturated red, green and blue. The "light" pixels may be one of white, cyan, magenta and yellow.

Accordingly, in the present example in which the source 101 is bi-level, the two cryptographic signals 115, 116 each are associated, through the respective lookup tables 130 and 131, with signals that have non-cryptographic and mutually distinguishable major components. The major component associated with one of the signals 115, 116 is always visually dark, while the major component associated with the other one of the signals 115, 116 is always visually light. Furthermore, the two cryptographic signals 115, 116 each are associated, through the respective lookup tables 130 and 131, with a cryptographic minor component (which may take the form of colour variations, for example).

The term "non-cryptographic" means that the mutually distinguishable major components can be distinguished from each other without reference to cryptographic considerations.

In multi-level (eg N-level, with N distinct color tones) documents, N cryptographic sources 102, . . . , 103 would be used. Each of the N sources would be associated, through respective lookup tables, with a cryptographic signal having N non-cryptographic and mutually distinguishable major components, and N cryptographic minor components.

Returning to the bi-level case in FIG. 2, the composite cryptographic signal 118 undergoes a merging process in a merge module 114, and a resultant merged composite signal 122 is recorded by a recording module (such as the printer 2215 in FIG. 1) onto a transfer medium to form, in the present example a printed tamper-evident document 105. The transfer medium is typically paper, used to form a printed document, in which case the transfer medium is referred to as a print medium. Another example of a transfer medium is silver halide film. A digital transfer of the merged composite signal is also possible.

Although the term "document" in this description is most often used in the context of a printed document comprising a print (transfer) medium upon which the merged composite signal 122 is printed by a printer (such as 2215 in FIG. 1), the term document has a more general meaning. Thus the term document can equally, for example, be applied to a recorded document comprising a silver halide film (transfer) medium upon which the merged composite signal 122 is recorded using a suitable optical process and/or device.

In yet another arrangement, the marking and verification process may be used in the preparation, storage, transfer and verification of digital document images. In this arrangement a computer application incorporating the disclosed anti-tampering approach firstly applies the marking process to digital document images. These images may have been produced as part of a scanning process, however they may alternately have been produced by purely digital means. The document images may then be subjected to one or more of archiving, transmission, re-encoding (such as conversion to a different digital image standard), re-sampling (such as occurs during image scaling), and compression or recompression (including so-called "lossy" compression such as baseline JPEG compression). After one or more of these operations the resultant image may then be verified using the disclosed verification process, and the results displayed using a second computer application. The use of the aforementioned marking and verification process is robust in the face of image transformations that do not make significant visual changes to the appearance of the image, even though they make substantial changes to the digital bit pattern of the image or its encoding.

The major components associated with the cryptographic signals 115, 116 making up the merged composite signal 122 allow the tamper-evident document 105 to be read by a person, or by a machine, in the same manner as the original source image 101 can be read. The minor perturbation component, that is additional to the information in the source image 101, may be visible in the tamper-evident document 105, but this perturbation is minor enough to be ignored by a human (or machine) reader. Accordingly, the tamper-evident document 105 is visually perturbed from, but intelligibly equivalent to, the source image 101. In other words, the source information, which is perturbed when printed onto the print medium, is still readable by person or machine.

In order to improve the robustness of the alignment process in the validation sub-system 127, an optional, visually faint coarse alignment signal 128 from a coarse alignment source 111 is superimposed, by the merging module 114, onto the modulated composite cryptographic signal 118. The coarse alignment signal is optional, because reliance can be placed on either (a) a manual registration mark approach, or (b) solely on the fine alignment process. Provided that sufficient computing resources are available, the fine alignment process alone can be used to achieve alignment, noting that this approach requires that a search be instituted. The disclosed fine alignment process will perform satisfactorily with either manual or alternate coarse alignment approaches. Further, in order to prevent the potential recovery of the cryptographic signals 115, 116 by examination of the composite signal 120 from multiple different tamper-evident documents 105, . . . , 105', the private key (see a step 2501 in FIG. 6) that generates the cryptographic signals 115, 116 can be made from two parts. The first part is fixed for multiple documents 105, . . . , 105' and this first part is required for the validation process performed by the validation sub-system 127 as it applies to any one of the documents 105, . . . , 105'. The second part is referred to as a "salt" value 129 from a salt generator 112, the salt value being unique for each document 105, . . . , 105' (see steps 2508 and 2501 in FIG. 6). Use of salt values is a known technique is the field of cryptography. The salt value 129 is faintly embedded by the merging module 114 into the modulated composite cryptographic signal 118 of each respective tamper-evident document 105, . . . , 105'. The salt value 129 is also provided, as depicted by an arrow 142, to the key generation module 134. The salt value 129 is recoverable by a coarse alignment and salt recovery module 113, during the validation process. Validation of the tamper-evident document 105 by the validation sub-system 127 thus requires the (common) first part of the private key and the salt value 129 that is specific to the tamper-evident document 105 as the second part of the private key. Validation of the document tamper-evident 105' requires the (common) first part of the private key and the salt value specific to the document 105' as the second part of the private key.

A common first part 140 of the private key is provided to the validation sub-system 127 by, for example, administrative means (eg by providing the first part in a sealed envelope handed to an operator for manual input into the validation sub-system 127). This part 140 is provided, as depicted by an arrow 141, to the crypto signal sources 102' and 103'. The second document-specific part of the private key can be extracted by the validation sub-system 127 from each tamper evident document 105.

Turning to the validation sub-system 127 that is used for tamper-detection (also referred to as validation) a scan-based tamper-evident signal 120 is derived by scanning, using the scanner 2218 in FIG. 1, the tamper-evident document 105 that has been produced by the production sub-system 126. The signal 120 contains a major component (purportedly reflecting the original information 117) and a minor component (purportedly introduced by the cryptographic signals 115, 116 under control of the selection module 104). The coarse alignment and SALT recovery module 113 performs coarse alignment of the tamper-evident document 105 to produce a "coarsely aligned" scan based tamper-evident signal 121. The salt module 113 also extracts the salt values from the signal 120 and provides the salt values, as depicted by arrows 139, to the crypto-signal sources 102' and 103'. A fine alignment module 106 correlates the chroma component of the coarsely aligned signal 121 with a signal made by merging (i.e. averaging) the synchronised cryptographic signals 115', 116' and associated colours 138, 137 from lookup tables 134, 135. The aforementioned merged cryptographic signals 115', 116' and the colours 137, 138 form a colour image version of the cryptographic signals 115', 116' as will be described in more detail in regard to FIG. 4.

The signals 115', 116' are cryptographic signals from cryptographic signal sources 102', 103' that are typically physically separate from, but identical to, the cryptographic signal sources 102, 103. The correlation performed by the fine alignment module 106 achieves fine scale synchronisation (i.e. alignment) between the coarsely aligned tamper-evident signal 121 and the cryptographic signals 115', 116' independently of the stronger major component that is human or machine readable in the tamper-evident document 105. This alignment forms a "finely aligned" scan based tamper-evident signal 123.

The validation process in the validation sub-system 127 then distinguishes, using a threshold module 107, between the major components of the cryptographic signals that are present in the finely aligned tamper-evident signal 123, to thereby form a bi-level signal 119. The bi-level signal 119 purports to be the bi-level signal 117. The purported document signal 119 is an N-level signal if the source signal 117 is N-level, and is 2-level for the present bi-level source example. The finely aligned tamper-evident signal 124, which is the same signal as indicated at 123, is then compared in a comparison module 108, with either a value from a lookup table 134 that is associated with the first cryptographic signal 115' or a value from a lookup table 135 that is associated with the second cryptographic signal 116' under control of a selection module 109 that is switched according to the bi-level value of the signal 119 at the corresponding scan position. The selection module 109 outputs a modulated composite cryptographic signal 125 according to the bi-level value of the signal 119 at the corresponding scan position. Scan positions (which are equivalently referred to as pixel positions) where the minor components of the signal 119 from the tamper-evident document 105, and the minor components from the corresponding modulated composite cryptographic signal 125 do not match within a certain tolerance are revealed as having been tampered with (eg via introduction of alterations) by a validated signal module 110.

Detailed Description of How the Tamper-Evident Document is Formed

The bi-level signal source 117 from the bi-level source image 101 represents, in the present example, a black and white document image in digital form. This (source) image 101 can originate as the output of a rasterisation process (RIP), a scan, or other equivalent source. In order to produce the tamper-evident document 105, a derivation of this source image 101 is marked onto the paper transfer media to become the tamper-evident document 105. The validation (i.e. tamper detection) process performed by the validation sub-system 127 requires that the media (used for the document 105) support more than two distinguishable values for each sample of the original source image 101. Thus the resolution of the original source image 101 must be such that this can be achieved.

The tamper evident document 105 must have high enough resolution to hold the necessary information. For example, if the printer is a halftone device, distinguishable values are obtained by using collections of device pixels.

The achievable spatial resolution varies with the printing technology. For most modern printing technologies, including electro photographic (laser) printing and thermal inkjet technology, the resolution of the original source image 101 should be approximately 200 Dots-per-Inch (DPI). In many cases higher resolutions are achievable. Lower resolutions for the source image 101 become increasingly more robust (that is, tolerant of errors and degradation inherent in the printing and scanning process), however have the obvious quality disadvantage.

The cryptographic signal 115 from the cryptographic signal source 102, and the cryptographic signal 116 from the cryptographic source 103 are derived from two-dimensional cipher fields generated from a stream cipher. In the described arrangement the cryptographic signals 115, 116 are generated using a master instantiation of the RC4 stream cipher with a 52-bit key. The cryptographic signals 115, 116 are generated by directing alternating bytes from the single master RC4 stream first to one (eg 115), then the other cryptographic signal (eg 116). Other stream ciphers or pseudo-random sequence generators can alternately be used, with different key lengths. An example of another technique is to use a pair of maximal-period Linear Feedback Shift Registers to generate the cryptographic signals 115, 116. This is described in more detail in relation to FIG. 6.

Figure 3:
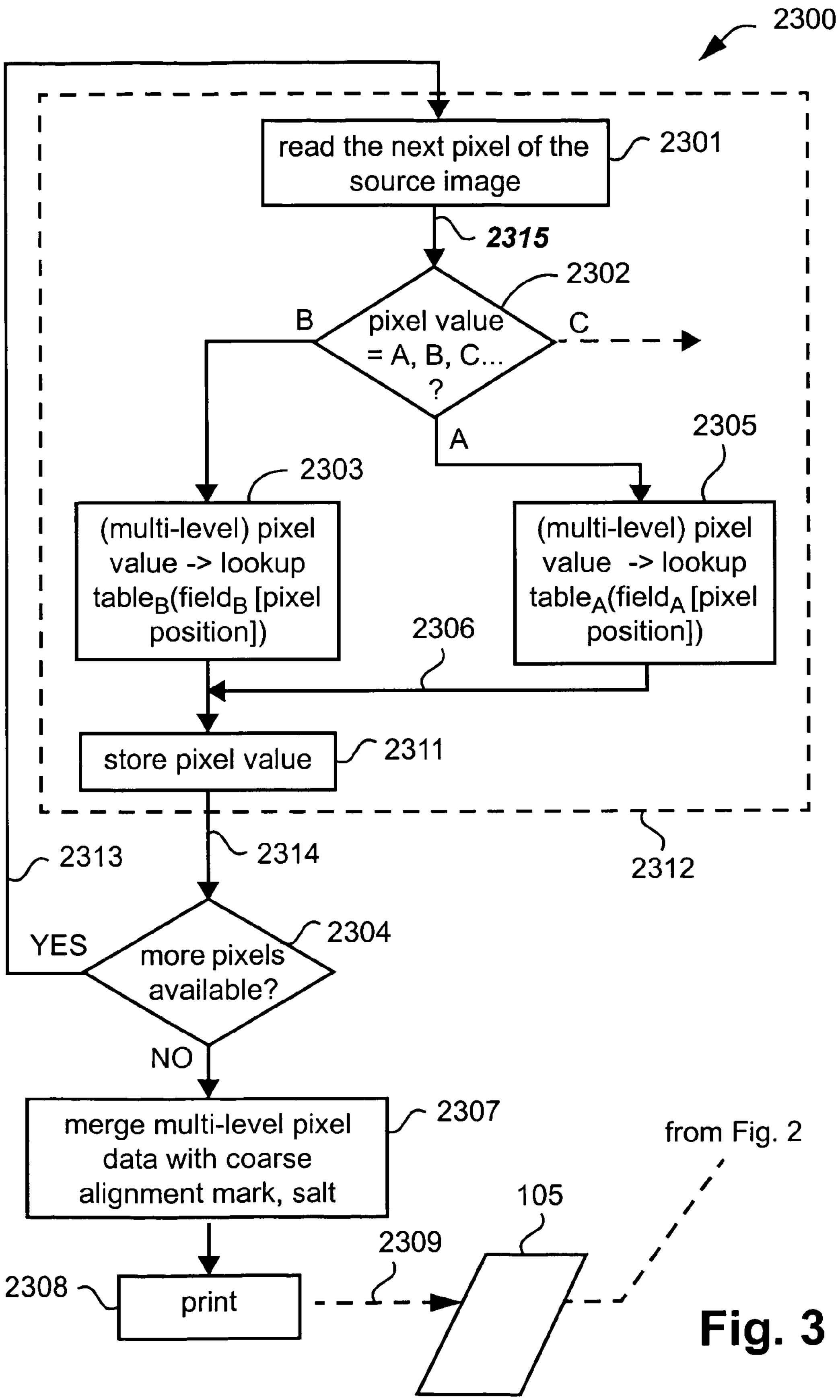
FIG. 3 shows process, using the system of FIG. 2, for producing a tamper-evident document.

FIG. 3 shows a process 2300 as a flow chart of method steps for producing a tamper-evident document according to the disclosed anti-tampering approach using the system of FIG. 2. The process 2300 commences with a step 2301, which reads the next pixel from the source image 101. Thereafter a decision step 2302 determines the value of the aforementioned pixel. In a bi-level case, to which the bulk of the present description is directed, the pixel that is read in the step 2301 will have one of two possible values. In a general case, however, the source image 101 can have N levels. In a general case, therefore, the decision step 2302 makes a determination as to which value the pixel read in the step 2301 has, noting that one of N values is possible. If the step 2302 determines that the pixel value is equal to B, then the process 2300 is directed according to an arrow B to a step 2303. The step 2303 determines a multi-level pixel value by (a) selecting a cipher field B, according to the pixel value, and then (b) selecting a value from the aforementioned cipher field depending on the position of the pixel in question, and finally (c) using the value chosen from the cipher field B to index a lookup table B in order to determine the multi-level pixel value. A subsequent step 2311 stores this pixel value and then the process 2300 proceeds to a testing step 2304. The step 2304 determines if more pixels are available in the source image 101. If this is the case, then the process 2300 is directed by a YES arrow back to the step 2301.

Returning to the testing step 2302, if it is determined that the pixel has a value A, then the process 2300 is directed according to an A arrow to a step 2305. The step 2305 functions in a similar manner to the step 2303, after which the process 2300 is directed to the step 2311.

Returning to the testing step 2302, if it is determined that the pixel has a value C then the process 2300 is directed in accordance with a dashed arrow C to a processing block (not shown) that is equivalent to the blocks 2303 and 2305. In the general case where the source document 101 has N levels, then the decision step 2302 can make one of N decisions.

Returning to the testing step 2304, if no further pixels are available then the process 2300 is directed according to a NO arrow to a step 2307. The step 2307 merges the multi-level pixel data with the course alignment mark and the salt value. Thereafter, a step 2308 prints the merged composite signal onto a print medium. This step results, as depicted by a dashed arrow 2309, in the tamper evident document 105 (see FIG. 2).

Figure 4:
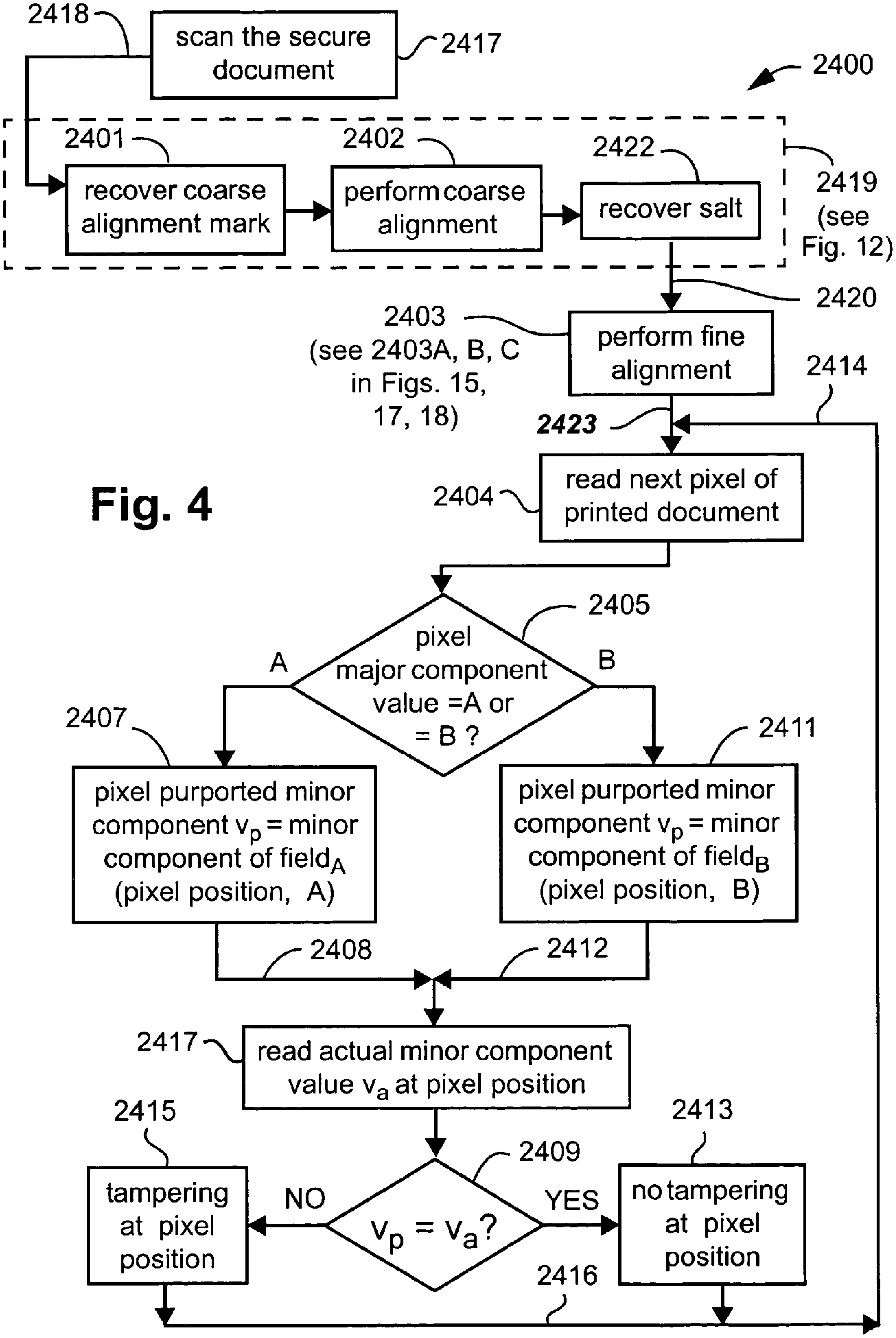

FIG. 4 shows a process 2400 as a flow chart of method steps for determining whether the tamper-evident document of FIG. 3 has been tampered with. The process 2400 commences with the step 2417, which scans the secure document 105. Thereafter, a step 2401 recovers the course alignment mark, after which a step 2402 performs course alignment of the tamper-evident document 105 to the cipher fields using the recovered course alignment mark. A subsequent step 2422 recovers the SALT value from the document 105. Thereafter, a step 2403 performs fine alignment between the tamper-evident document 105 and the cipher fields. The fine alignment step 2403 comprises three sub-processes. A first sub-process 2403A performs block correlation to form a displacement map, as described in more detail in regard to FIG. 15. A second sub-process 2403B performs interpolation in regard to the displacement map as described in more detail in regard to FIG. 17. A third sub-process 2403C performs warping to form the finely aligned document, as described in more detail in regard to FIG. 18.

A following step 2404 reads a next pixel of the scanned document 105 after which a testing step 2405 tests, for a bi-level source image 101, whether the major component of the pixel has the value A or the value B. In a similar fashion to that described in relation to FIG. 3 if the source image 101 has N levels, then the testing step 2405 has N decision branches.

In the present example if the pixel major component has the value A then the process 2400 is directed by an A arrow to a step 2407. The step 2407 determines the purported minor component at the noted pixel position. This is done by considering the cipher field A at the pixel position in question, and using this cipher field value to index the relevant lookup table (see 130 and 131 in FIG. 2). This generates the purported minor component. Thereafter, a step 2417 reads the actual minor component value at the pixel position in question from the printed document 105. A subsequent testing step 2409 checks whether the purported minor component value from the step 2407 equals the actual read minor component value from the step 2417 within some tolerance. If this is not the case, then the process 2400 is directed by a NO arrow to a step 2415 that declares that tampering has taken place at the pixel position noted.

Returning to the testing step 2405 if the pixel major component has the value B then the process 2400 is directed according to a B arrow to a step 2411. The step 2411 functions in a similar manner to the step 2407, i.e., by referencing the cipher field B at the pixel position in question, and using the cipher field value to index the relevant lookup table 130 or 131 from FIG. 2 in order to determined the purported minor component at the pixel position in question. Thereafter, the process 2400 is directed to the step 2417.

Returning to the testing step 2409, if the purported minor component from the steps 2407, 2408 equals the actual read minor component from the printed document from the step 2417 to an acceptable tolerance, then the process 2400 is directed according to a YES arrow to a step 2413. The step 2413 declares that no tampering has been detected at the pixel position of interest. The process is then directed by an arrow 2414 to the step 2404. From the step 2415 the process 2400 is also directed to the step 2404.

Generating a Two-Dimensional Cipher Field

Figure 5:
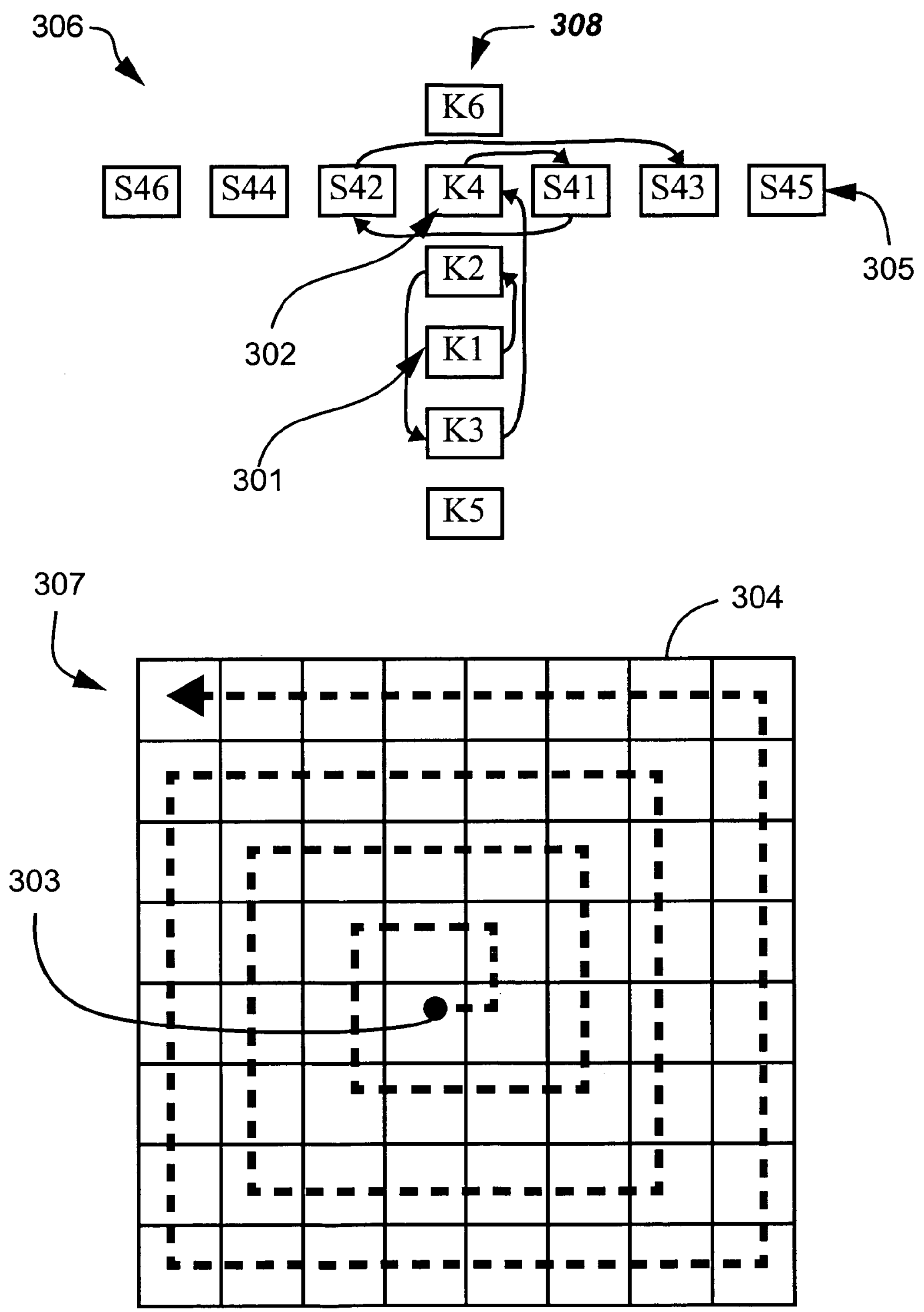
FIG. 5 depicts two approaches for generating a two-dimensional cipher field from a stream cipher.

FIG. 5 depicts the generation of a two-dimensional cipher field (also referred to as a two-dimensional cryptographic field), and shows two approaches for generating two-dimensional cipher fields 306, 307 from a stream cipher. Generation of cipher fields is performed both in the production sub-system 126 by the sources 102 and 103 (see FIG. 2), and in the validation sub-system 127 by the sources 102' and 103' (see FIG. 2) according to a process 2500 that will be described in relation to FIG. 6.

It is desirable to convert the stream ciphers into two-dimensional cipher fields in such a way that the cipher fields can be reproduced for use in the validation process with only the cryptographic key data. In particular, it is desirable to avoid any dependence on the scanline length of the original source image 101, which would occur, for example, if the stream ciphers were simply converted to cipher fields in raster order. It is also desirable to generate the cryptographic fields 306, 307 in raster order. The fields 306, 307 are generated with respect to a nominal centre position of the source image 101, which is typically, although not necessarily aligned approximately with the spatial centre of the image 101.

Considering the cipher field 306 in FIG. 5, a key K1 (ie 301) is a first 52 bit sequence generated for utilisation by one of the cryptographic signal sources (102 or 103 in FIG. 2). Subsequent 52 bit segments of the stream cipher are assigned to key positions alternately above (eg at K2) the one previously generated (eg K1), and below (eg at K3) the one previously generated (eg K1). In this manner a central spine 308 of initial 52 bit sequence keys is generated, the spine 308 being of any desired length in the vertical direction. Each of these 52 bit keys K1, K2, . . . , is associated with a horizontal scanline (eg 305) of the cipher field 306 being generated.

To generate any particular scanline (eg 305) of the cipher field 306, a second RC4 cipher generator is initialised with the key associated with that particular scanline. Thus, for example, the key K4, also referred to as 302, is used in relation to the scan line 305. Successive multi-bit "S" values are generated from the second RC4 cipher generator, and are alternatively associated to the right (eg at S41), then left (eg at S42), of previously generated "S" values on that scanline. Each multi-bit "S" value forms a value (such as S42) in the cipher field 306. Two cipher fields 306 and 306' (the latter not being shown), associated with the sources 102 and 103, are concurrently generated in order to maintain synchronisation with the master cipher stream.

The spine 308 is used to form the cipher fields 306 and 306', but the spine 308 does not form part of the cipher fields themselves. The cipher fields 306, 306' are made up of the "S" values only. The spine 308 (ie the "K" values) is formed of 52 bit keys, and the "S" values (which form the cipher fields) are 2-bit values in the present example.

Other methods of producing cipher fields are possible. The reference numeral 307 shows another cipher field in which 303 indicates the commencement of an alternate spiral based arrangement of filling a raster grid 304. This arrangement 307 has the advantage of only requiring a single stream cipher engine, but requires extra buffering in some implementations.

Although the absolute size of the cipher fields 306, 307 are not necessarily the same size as the source document 101, the S values of the cipher fields are referred to as being "congruent" with the pixels of the source image 101 so that there is a unique 1:1 correspondence between each pixel of the source image 101 and corresponding S values of the cipher fields output by the cryptographic signal sources 102, 103. The alignment that is performed by the validation sub-system 127 re-establishes this congruency in order to perform the anti-tampering method.

Figure 6:
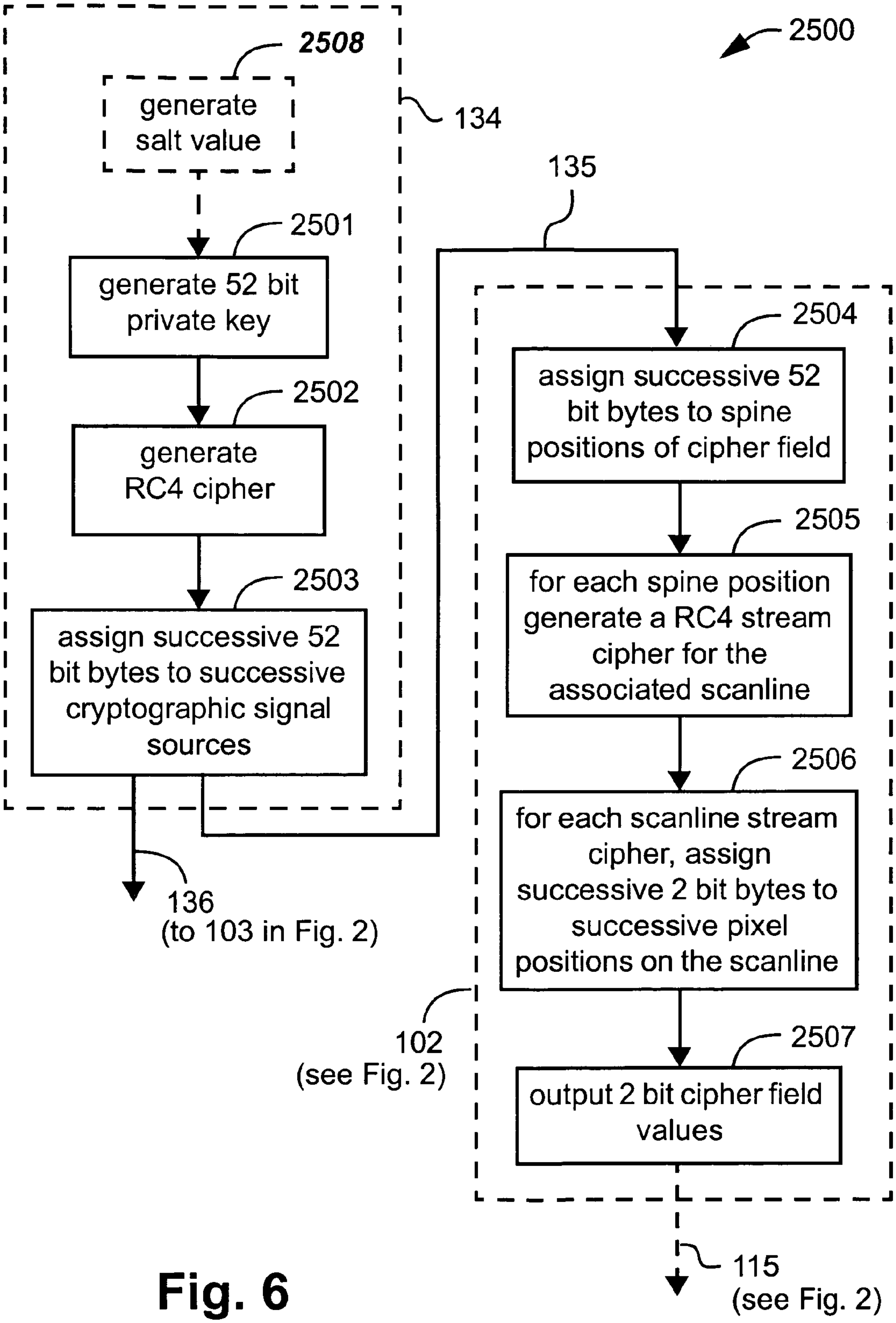
FIG. 6 shows a process for generating the cipher field in FIG. 5.

FIG. 6 shows a process 2500 as a flow chart of method steps for generating one of the cipher fields in FIG. 5. The process 2500 is implemented by the key generating module 134 and the cryptographic signal source A (ie., 102) as described in relation to FIG. 2. Turning to the key generation module 134 a first step 2508 in FIG. 6 generates a SALT value. This is an optional step as depicted by the dashed outline for the step 2508. Thereafter, a step 2501 generates a 52 bit private key, using the SALT value if this option has been elected. A subsequent step 2502 generates an RC4 cipher stream. A following step 2503 assigns successive 52 bit bytes of the cipher stream to successive cryptographic signal sources such as the source 102, as depicted by an arrow 135. An arrow 136 depicts how alternating 52 bit bytes are directed to the signal source 103.

Considering the signal source 102, a first process step 2504 assigns successive 52 bit bytes received from the key generating module 134 to spine positions of the cipher field as described in relation to FIG. 5. Thereafter a step 2505, for each spine position, generates an RC4 stream cipher for the associated scanlines. A following step 2506, for each scanline stream cipher, assigns successive two bit bytes to successive pixel positions on the scanline. Thereafter a step 2507 outputs 2 bit cipher fields values.

Combining the Original Image and the Cipher Fields

Returning to consider FIG. 2, particularly in regard to the operation of the selection module 104, it is noted that for the selection operation (see the corresponding steps 2302, 2303 and 2305 in FIG. 3) the two cipher fields from the cryptographic sources 102, 103 and the original image from the source 101 are firstly aligned on their nominal centres. At this selection stage (corresponding to the process 2312 in FIG. 3) the choice of alignment position is nominal. The alignment position selected however, becomes locked and encoded into the tamper-evident image 105 and forms the basis for alignment in the recovery process (see FIG. 4) by the validation sub-system 127.

In the preferred arrangement, each value in each of the two 2-dimensional cipher fields such as 306 (see FIG. 5) that are generated by the cryptographic signal sources 102, 103 (see FIG. 2) has 2-bits of precision. Accordingly, in the described example the source information 117 is bi-level, having 1-bit of precision, while the tamper-evident document 105 has two sets of four-levels, having 2-bits of precision each, giving a total of eight possible states for the corresponding printed form of each source document pixel. The number of states (ie the amplitude resolution in this example) for each cipher signal (eg 115, 116 in FIG. 2) as the cipher signal relates to each input pixel (at 117 from the source image 101 in FIG. 2) can be varied. The preferred arrangement uses 4 states (thus the 2 bits), however anything from 2 states upwards will be effective.

The choice of how many states to use for the cipher values 115, 116 influences the ability of a forger to "guess" what the correct value of the minor signal of a printed pixel on the tamper-evident document 105 will be when the forger changes the value of the pixel from black to white or vice versa. The choice of 2 bits in the present example means that a forger will probably guess incorrectly 75% of the time, thus providing a strong indication of forgery with even small collections of pixels.

The multi-level (i.e. having more than one bit per pixel) tamper-evident image merged signal 122 (see FIG. 2) is generated for each pixel of the original source image 101 using the associated cryptographic signal value 115 or 116 from the corresponding cipher fields output by the associated cryptographic signal sources 102, 103 to index the respective lookup tables 130, 131. In the preferred arrangement the output device used to print the tamper-evident document 105 is the printer 2215, which for the present example is a colour printer. The multi-level image on the tamper-evident document 105 is a 24 bit RGB image in the present example.

Figure 7:
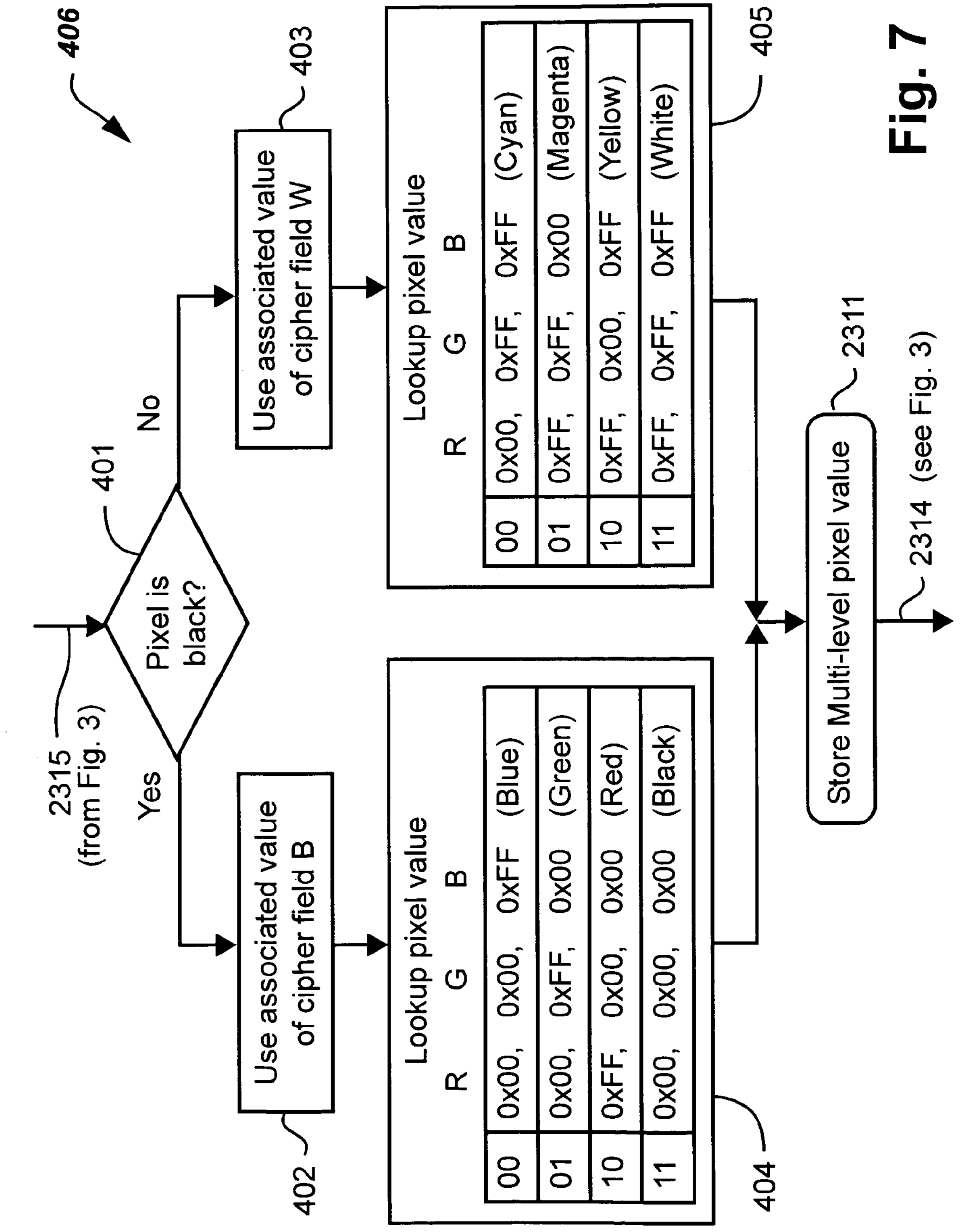
FIG. 7 shows one example of the selection process of FIG. 2 that is used to convert a bi-level source pixel into a multi-level tamper-evident pixel.

FIG. 7 shows a particular example 406 of how the selection module 104 operates in conjunction with the cryptographic signal sources 102, 103 and their respective lookup tables 130, 131 (see FIG. 2). The process 406 converts a bi-level pixel value in the source information 117 into a multi-level pixel value in the modulated composite cryptographic signal 118 (see FIG. 2). The arrow 2315 (see FIG. 3) leads to a step 401, which considers a pixel of the original source image 101. If the pixel under consideration is black, the process 406 follows a "Yes" arrow to a step 402, which selects, from a B (for Black) cipher field, the 2 bit value from the position in the cipher field associated with the pixel being considered. However, if the pixel is white, the process 406 follows a "No" arrow to a step 403 which selects, from a W (for White) cipher field, the 2 bit value from the position associated with the pixel under consideration. The steps 401-403 are performed by the selection module 104 selecting between the cipher signals 115, 116 from the respective cipher sources 102, 103 (see FIG. 2).

If the pixel being considered is Black, then the 2-bit cipher value that is selected in the step 402 from the cipher field "B" is used to index a difference lookup table 404. The pixels in the lookup table 404 are all either black, or some dark colour. In the preferred arrangement, black and fully saturated red, green and blue are used. If the pixel being considered is White, then the cipher value that is selected in the step 403 from the cipher field "W" is used to index a difference lookup table 405. The pixels in the lookup table 405 are all either white, or some light colour. In the preferred arrangement, white, cyan, magenta and yellow are used. These colours are used because they are easy to visually distinguish from each other, either by a human eye or using automatic video extraction techniques. This selection of colours results in a robust validation system 127. Other colours may, however, be used. The lookup tables 404, 405 are particular examples of the lookup tables 130, 131 in FIG. 2.

If, for example, the step 402 produces a cipher value "10" from the B cipher field, then this value "10" indexes the (RGB) lookup table 404 at "10" to result in an output of FF (in hexadecimal notation) for the R channel, 00 for the Green channel, and 00 for the Blue channel, which equates to an output of Red.

The steps 401-405 produce a multi-level pixel value that is stored at the step 2311 (see FIG. 3), after which the process 406 proceeds according to the arrow 2314 (see FIG. 3).

Non-colour based schemes can also be used. For example, in a pure grey-scale scheme, different levels of grey could be used, as long as it is possible to discriminate between them in a high majority of cases after the security document has been printed and scanned. Another method that can be used is a set of small patterns, one for each state of the cipher fields, of bi-level (typically black and white) device pixels, in a cell corresponding to each source document pixel.

Figure 8:
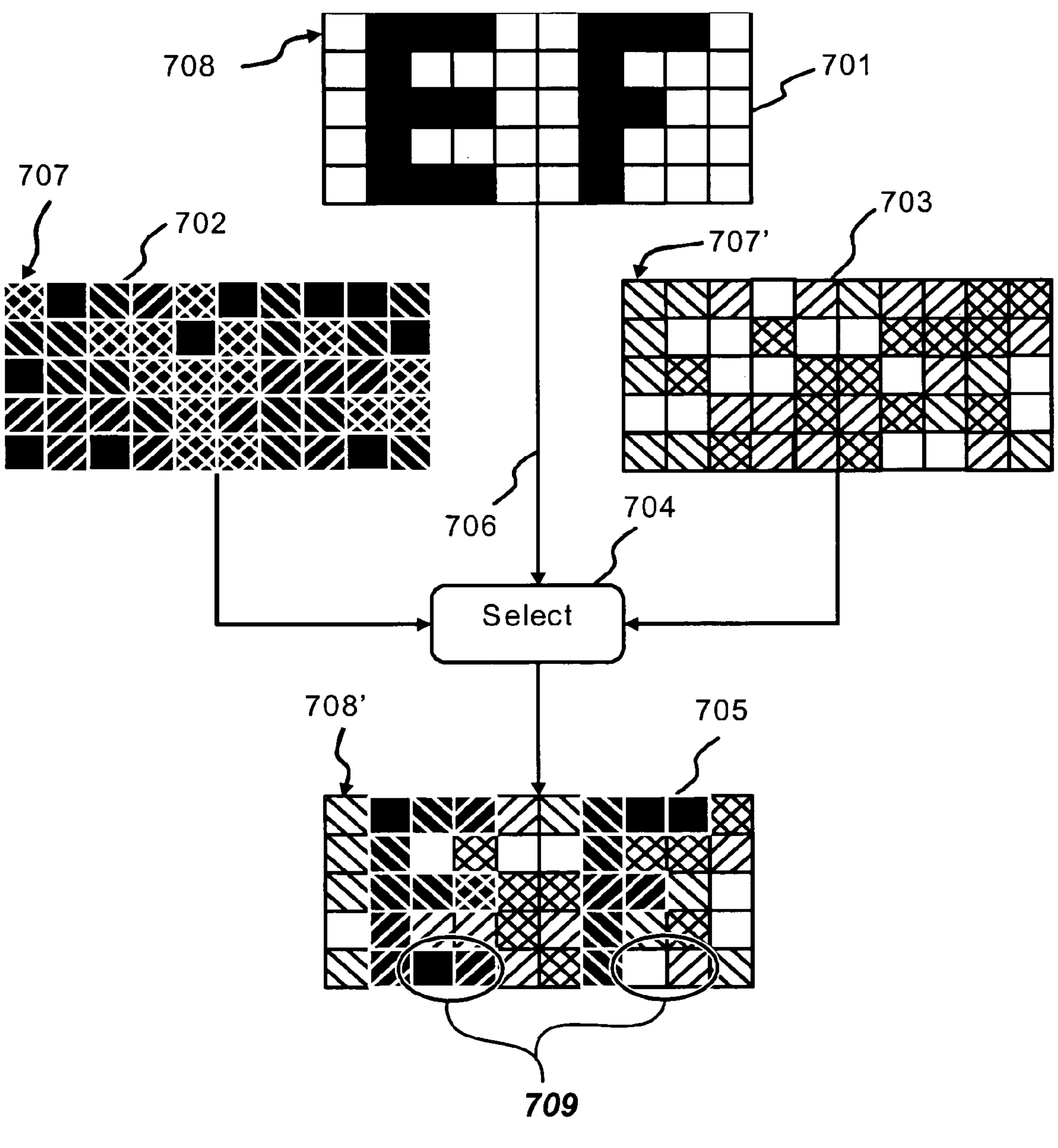
FIG. 8 shows a pictorial example of a bi-level image being converted to a multi-level image.

FIG. 8 shows a pictorial representation of conversion of a bi-level image 701 (such as that associated with the source image 101 in FIG. 2) to a multi-level image 705 (such as that associated with the tamper-evident document 105). The original image 701, (which is a particular instance of the source image 101 in FIG. 2), is used to control a selection module 704, (which is a particular instance of the selection module 104 in FIG. 2), on a pixel by pixel basis.

The selection module 704 selects, on a per-pixel basis controlled by pixel values 706 from the image 701, between the colour options of two cipher field derived colour grids 702 and 703. The colour grids are generates as follows. A pixel value for the pixel position 707 in the "black" colour grid 702 is determined by using a corresponding cipher value for the noted pixel position 707 in a "black" cipher field (not shown). The black cipher field is a specific instance of the cipher field 115 that is generated by the corresponding cryptographic source 102. The aforementioned cipher value from the black cipher field is used to index a multi-level colour value in a corresponding lookup table (not shown) similar to the table 404 in FIG. 7. A pixel value for the pixel position 707' in the "white" colour grid 703 is determined by using a corresponding cipher value for the noted pixel position in a "white" cipher field (not shown), to index a multi-level colour value in a corresponding lookup table (not shown) similar to the table 405 in FIG. 7.

Since the pixel value at a pixel position 708 in the original image 701 is white, the selection module 704 selects the colour value of the pixel position 707' in the colour grid 703 to be inserted at the pixel position 708' in the tamper evident image 705.

Figure 19:
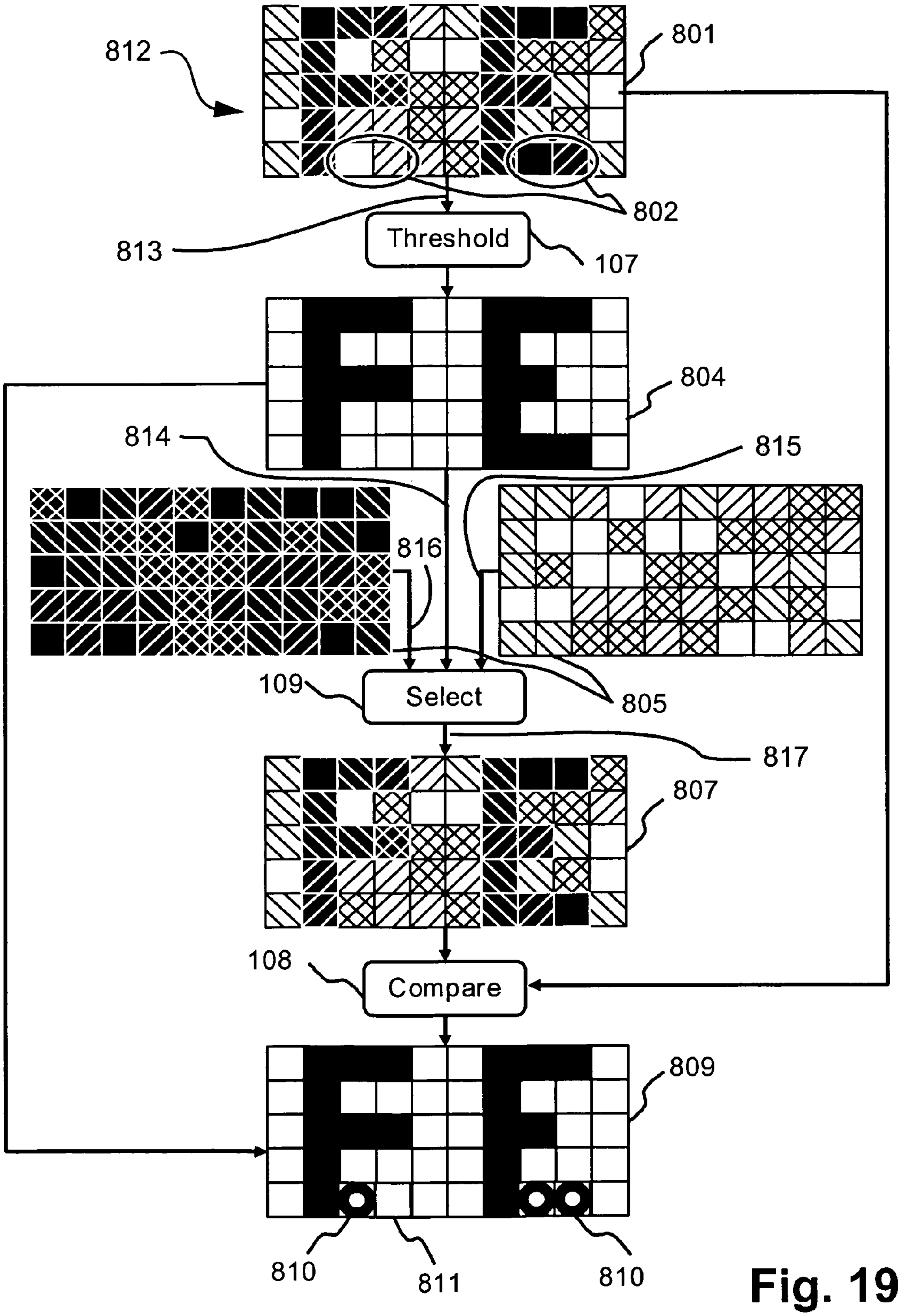
FIG. 19 shows an example of tamper detection.

The pixels 709 will be referred to in regard FIG. 19 in relation to tamper detection.

The Coarse Alignment Mark

Figure 9:
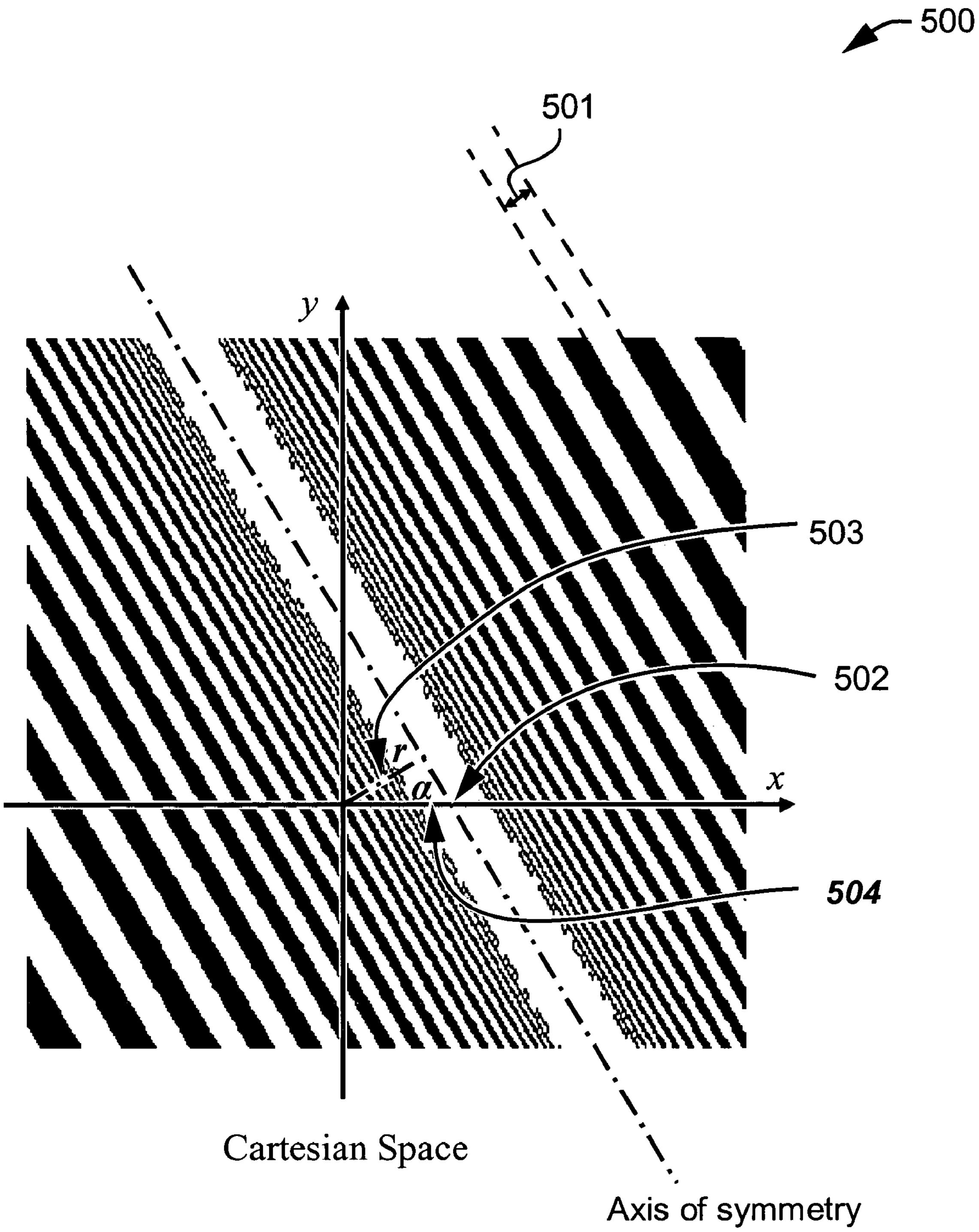
FIG. 9 shows a bi-level representation of a two-dimensional linear corrugated function used for coarse alignment.

FIG. 9 shows a bi-level representation of a two-dimensional linear corrugated function used for alignment. In order to aid the precision alignment that is performed by the fine alignment module 106 used in the validation sub-system 127 in FIG. 2, a coarse alignment mark using the corrugated function of FIG. 9 is incorporated by the coarse alignment source 111 and the merge module 114, into the composite cryptographic signal 118 to form the multi-level image printed onto the tamper-evident document 105 (see FIG. 2). In the preferred arrangement a faint coarse alignment pattern image using the function depicted in FIG. 9 is mixed by the merge module 114 with the modulated composite cryptographic signal 118 (see FIG. 2). This mixing is performed by addition or subtraction of suitable values to one or more of the color channels of each pixel value in the modulated composite cryptographic signal 118. The amount added is too small to affect the discrimination between colors that will be performed by the threshold module 107 in the validation process 127. The alignment pattern is formed from a particular configuration of the one-dimensional scale invariant functions shown in FIG. 9 that can be efficiently detected using Fourier methods. The particular configuration of the one-dimensional scale invariant functions that is selected is chosen so that the symmetry axes of the functions intersect at points that define line segments that have certain ratios of lengths that are invariant under affine transformations. This will be described further in regard to FIG. 12, particularly in regard to step 1790.

The alignment pattern image is a superposition of four 1-dimensional scale invariant patterns as shown in FIG. 9 that have been extended in the transverse direction to cover the source image 101 of FIG. 2. A single one-dimensional scale invariant pattern may be represented mathematically as follows:

$$f(x)=\cos(\gamma\log|x-x_0|) \qquad (1)$$

where $\gamma$ is a constant that specifies how quickly the pattern oscillates (the faster the oscillations the smaller a distance 501 becomes) and $x_0$ specifies a line of symmetry 502 for the pattern.

Figure 10:
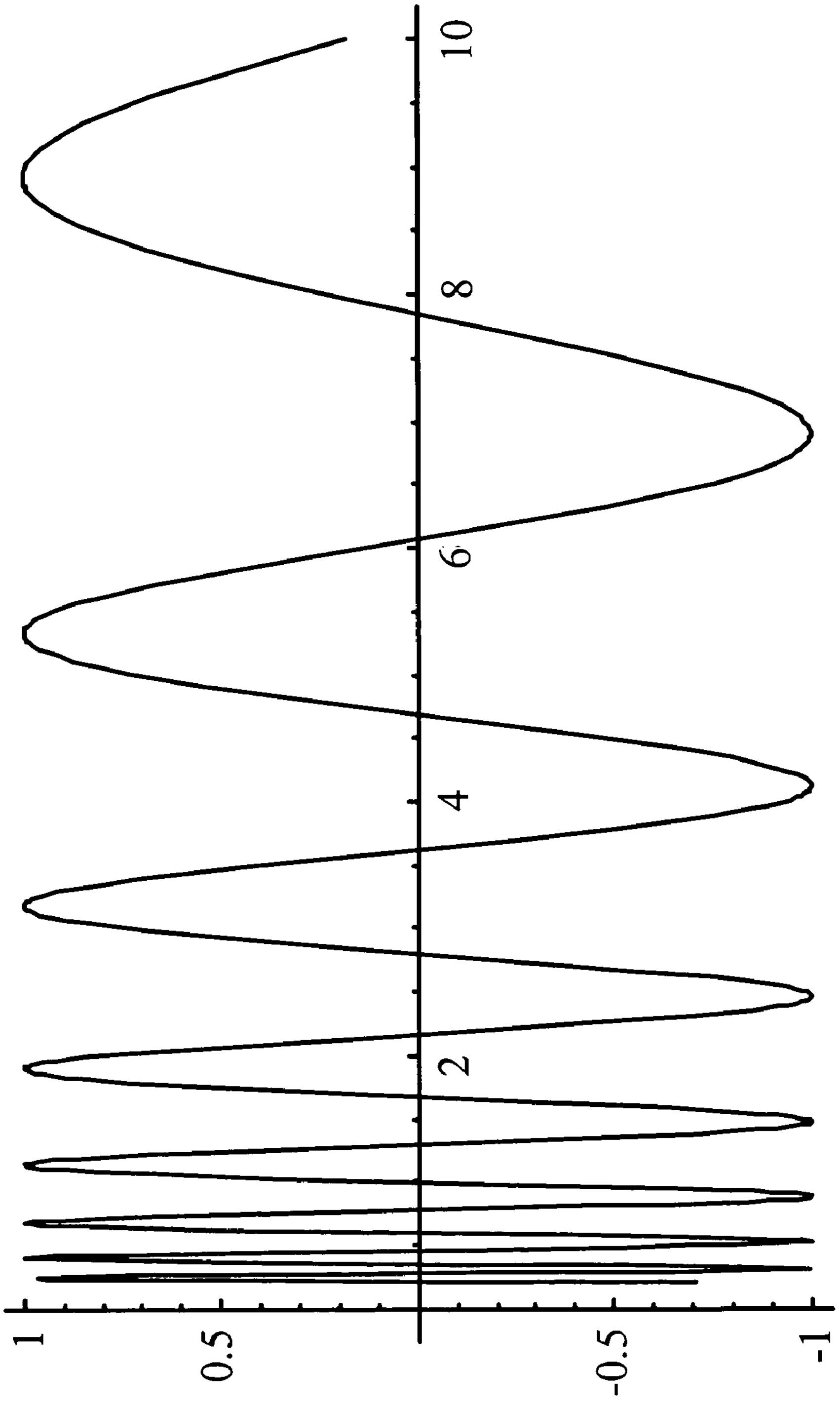
FIG. 10 shows a graphical representation of the linear corrugated function of FIG. 9.

FIG. 10 shows a graphical representation of the linear corrugated function depicted in FIG. 9. It is noted that a one dimensional scale invariant pattern that has been extended in the transverse direction is specified by two parameters, its radius, r, and its angle, $\alpha$. The two-dimensional functional form (shown in FIG. 9) of such a pattern is represented mathematically by:

$$f(x,y)=\cos(\gamma\log|x\cos\alpha+y\sin\alpha-r|) \qquad (2)$$

where r (see 503 in FIG. 9) is the radius of the pattern, and $\alpha$ (see 504 in FIG. 9) is its angle.

The four one-dimensional scale invariant patterns that are superimposed to form the desired alignment pattern (at 128 in FIG. 2) have r and $\alpha$ parameter values that give them a particular spatial configuration relative to each other (see FIG. 11) that is advantageous in determining the alignment of the tamper-evident document 105 into which the alignment pattern 128 has been incorporated. This spatial configuration is represented in FIG. 11.

Figure 11:
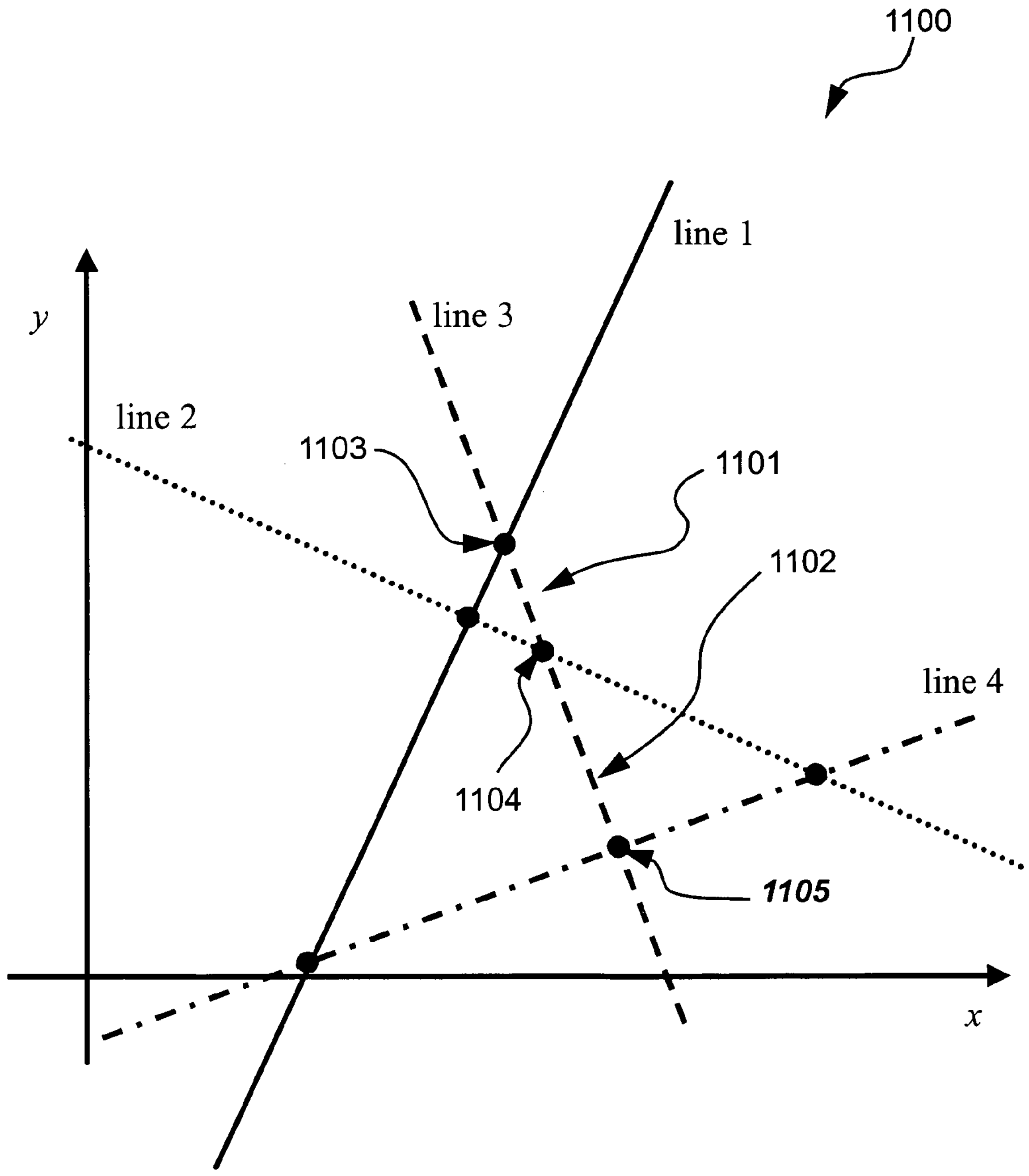
FIG. 11 shows an example of axes of symmetry from a predefined set of four linear corrugated functions used to form the alignment mark used in coarse alignment of the tamper-evident document.

FIG. 11 shows a configuration of axes of symmetry from linear corrugated functions used in alignment detection. As will be described further in regard to FIG. 14, the set of parameters establishing these axes of symmetry are specially chosen so that the symmetry axes define line segments that have certain ratios of lengths (exemplified by the ratio 1101:1102) that are invariant under affine transformations.

In the preferred arrangement the original source image 101 has a minimum pixel dimension of at least 1024 pixels in both the width (x) and height (y) dimension, although it may be larger in either or both. This minimum pixel dimension is referred to as $N_{min}$ in the equations below. In general, the source image 101 has dimensions of N pixels wide by M pixels high where $M \geqq N_{min}$, and $N \geqq N_{min}$. The values of the pattern parameters r and $\alpha$ for the 4 patterns used to form the alignment mark 128 are as follows:

$$\begin{aligned} r_1 &= P_d,\ \alpha_1 = \frac{9}{16}2\pi \\ r_2 &= P_d,\ \alpha_2 = \frac{13}{16}2\pi \\ r_3 &= P_d,\ \alpha_3 = \frac{3}{16}2\pi \\ r_4 &= \frac{P_d}{\sqrt{2}},\ \alpha_4 = \frac{15}{16}2\pi \end{aligned} \qquad (3)$$

where:

$$P_d=N_{min}/(2+\sqrt{2}) \qquad (4)$$

The Nyquist radius $R_{NYQ}=50$, is also specified. The Nyquist radius is the number of pixels from the axis of symmetry of the pattern where the frequency of the pattern is equal to the Nyquist frequency of the image. The distance from the axis of symmetry to the first visible corrugation represents the Nyquist frequency.

For the jth pattern, with parameters $r_j$ and $\alpha_j$ the intermediate quantities $D_j$, $X_j$, $Y_j$, and $R_j$ are pre-calculated as follows:

$$\begin{aligned} D_j &= \cos\left(\frac{\pi}{2} frac\left(4\left(\alpha_j+\frac{1}{8}\right)\right)-\frac{\pi}{4}\right) \\ X_j &= \left\lceil\frac{N}{2}\right\rceil + r_j\cos\alpha_j \\ Y_j &= \left\lceil\frac{N}{2}\right\rceil + r_j\sin\alpha_j \\ R_j &= -(X_j\cos\alpha_j+Y_j\sin\alpha_j)/D_j \end{aligned} \qquad (5)$$

The "influence", $P_j(x, y)$, of the jth pattern to the pixel at offset (x, y) is given by $$\text{if } (|R_j|>R_{NYQ})$$

$$P_j(x,y)=\cos(\pi R_{NYQ}\log(|R_j|))$$

$$\text{else}$$

$$P_j(x,y)=0 \qquad (6)$$

The influence of the patterns are used to suitably scale the alignment and salt signals (128 and 129 respectively) in order not to unacceptably distort the source image 101 while allowing the anti-tampering approach to be effectively performed.

Adding a SALT Value to Prevent Dictionary Attacks

Returning to FIG. 2, if the same cryptographic key (such as generated by the step 2501 in FIG. 6) is used to generate more than one page of the tamper-evident document 105, the cipher fields 115, 116 generated by the cryptographic signal sources 102, 103 are potentially discoverable by harvesting light and dark areas from different pages of the document 105. To prevent this possibility, the preferred arrangement employs a salt value provided by the salt generator 112. A salt is a known technique in the field of cryptography for preventing dictionary attacks. The salt technique can also be used in this case to prevent attacks based on the similarity of the cipher stream on two different pages of the tamper-evident document 105.

In the preferred arrangement, it is desired that keys such as are generated by the step 2501 in FIG. 6 be well known to the generator (i.e. the user of the production sub-system 126) of the tamper-evident document 105 and to the verifier thereof (i.e. the user of the validation sub-system 127). However, to prevent attacks based on the similarity of the cipher stream for two pages of the tamper-evident document 105, a different key should be used for each page thereof. To achieve both these aims, the preferred arrangement forms the keys in two parts. The first part of the key, say of length 40 bits, is well known to both the production sub-system 126 and the validation sub-system 127. This first part is the same for each page of the tamper-evident document 105. The remaining part of the key, i.e. the salt of length 12 bits in this case, is different for each page of the tamper-evident document 105. This salt is generated cryptographically (i.e. using effectively "random" numbers) for each page of the tamper-evident document 105. The salt value is embedded in the associated page without being encrypted. The actual 52-bit key generated by the step 2501 in FIG. 6 which is used for each signal 115, 116 in the production sub-system 126 and 115' 116' in the validation sub-system 127 is the concatenation of the fixed 40 bits with the 12 bit salt.

The 12 cryptographically (randomly) generated salt bits are divided into 2 6-bit sections $s_a$ and $s_r$, these sections representing, respectively, the angle and position of a fifth scale-invariant pattern similar to those shown in FIGS. 9 and 11. Both $s_a$ and $s_r$ can assume 64 distinct values. This fifth scale-invariant pattern having a particular angle and position is embedded into the signal 118 to thereby form the tamper-evident document 105 in the production sub-system 126. The validation sub-system 127 extracts this fifth pattern, thereby determining the associated angle and position of the pattern. This angle and position establish the 2 6-bit salt value sections. The fifth scale-invariant pattern is embedded in the same manner described for the other four patterns, except with a different oscillation constant γ, in particular:

$$\text{if } (|R_5| > R_{NYQ}) \quad P_5(x,y) = \cos\left(\frac{\pi}{2} R_{NYQ}\log(|R_5|)\right) \quad \text{else} \quad P_5(x,y) = 0 \tag{7}$$

where: The parameters are calculated as:

$$r_5 = s_r P_d / 64$$

$$\alpha_5 = 2 s_a \pi / 64 \tag{8}$$

The selection of a different oscillation constant for the fifth pattern causes some degree of separation in the detection space between the SALT value and the coarse alignment pattern. Interference can be further reduced by avoiding particular angles that are close to the angles used in the coarse alignment mark.

Merging the Coarse Alignment and SALT Patterns

Turning to the function of the merging module 114 in FIG. 2, the net influence caused by the alignment and salt patterns is determined by the sum $$P(x, y) = \sum_{i=1}^{5} P_i(x, y).$$

This value ranges from −5 to 5. The value is then scaled up to range from −15 to 15 and added directly by the merging module 114 to each channel of the modulated composite cryptographic signal 118, this being a multi-level RGB image, clamping the result to the range 0 . . . 255. This scaling operation enables the coarse alignment mark and the SALT value to be extracted from the document 105 while not unduly perturbing the original source information 101 in the document 105.

Result of the Marking Process

The final multi-level image at 122 of FIG. 2 is printed onto the tamper-evident document 105 using the colour printer 2215 which can, for example, be a Canon IR C3200 electrophotographic multi-function copier or a Canon i950 thermal inkjet printer. Scaling of the 200 DPI image to the printer resolution is preferably achieved with simple pixel replication. For example, a Canon IR C3200 has a device resolution of 600 DPI. For this printer each of the 200 DPI pixels of the final multi-level image is replicated in a 3×3 group of the IR C3200 device pixels.

The result of the marking process effected by the merging module 114 is the printed document 105 that is human-readable by virtue of the light and dark areas that correspond to the black and white values of the original bi-level digital image 101. An illustration of this marking is depicted in FIG. 8.

Returning to FIG. 8, it is noted that the light and dark areas such as 707' and 707 respectively each contain a minor component, respectively depicted by uni-directional cross hatching at 707' and bi-directional cross-hatching at 707. These minor components, in the absence of the key that generates them, contain no useful information, and cannot easily be forged. However there is an exact correspondence between the presence of the two minor components, and the overall darkness and lightness of each pixel that respectively represent the major components at each pixel. An inspector with knowledge of the respective major and minor components can verify the existence or lack of this correspondence. It is improbable that a forger could appropriately change a pixel (i.e. with respect to the major component) from light to dark (or vice versa) because the forger will not be able to correspondingly change the associated minor component. The forger cannot maintain the correspondence because the forger does not know the value of the minor components for an alternate major component at a given pixel position.

The Verification Process

Turning to the validation sub-system 127 in FIG. 2, the tamper-evident document 105 which is to be verified is first scanned with the colour scanner 2218 (see FIG. 1) to produce a 24 bit RGB tamper-evident signal 120. The scan resolution of the scanner 2218 must be higher than or equal to the resolution of the original image 101. In the preferred arrangement a 600 DPI scanner 2218 is used, which provides a generous margin over the 200 DPI original image 101 (see FIG. 2).

Overview of the Coarse Alignment Process

Turning to the operation of the coarse alignment and salt recovery module 113 in FIG. 2, the coarse alignment pattern (which comprises, in the present example, four alignment marks that were faintly added by the merge module 114 to the signal 118 before printing the tamper-evident document 105) is detected and analysed to produce an affine transform that relates the orientation of the scanned document 120 to the cipher fields.

Figure 12:
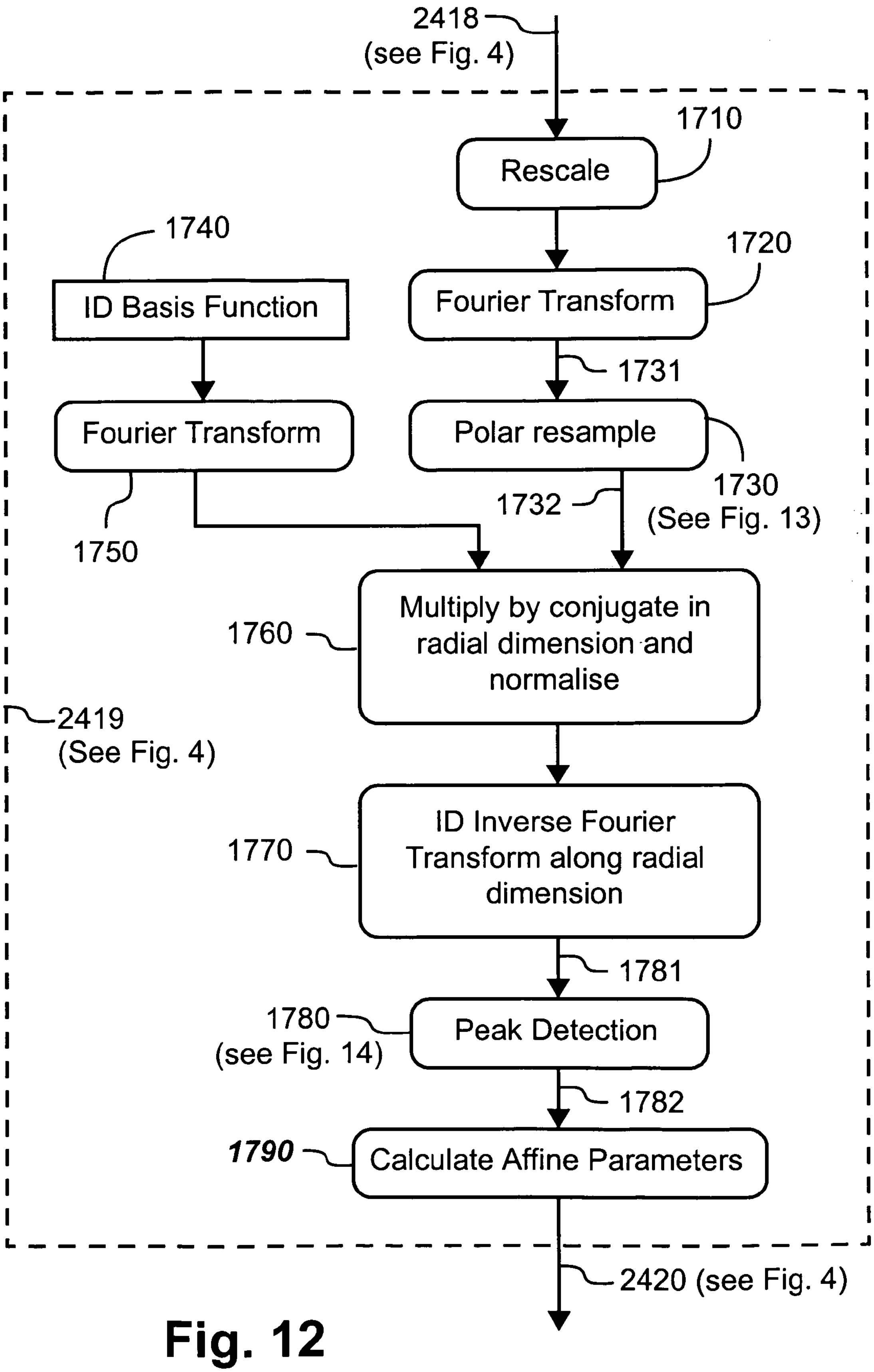
FIG. 12 shows the coarse alignment process of FIG. 4 in more detail.

FIG. 12 shows the coarse alignment process 2419 of FIG. 4 that is performed by the coarse alignment and salt recovery module 113 of FIG. 2. The scanned document, in the form of the luminance channel of the scanned tamper-evident signal 120, is first resized in a step 1710 by a process of successive halving until a resultant image is sized such that the smallest of the width and height are in the range 256 to 511 pixels. The halving process may be performed by convolving the image, in the form of the signal 120, with a low-pass filter and decimating the result of the convolution.

The resulting resized image then undergoes a two-dimensional Fast Fourier Transform (FFT) in a step 1720, and the result is resampled in a step 1730 into a quasi-polar frequency space. The step 1730 can use a direct polar transform of the two-dimensional FFT from the step 1720 by resampling the FFT onto a polar grid using bicubic interpolation. Whilst simple, this method produces artefacts that can adversely affect detection. A preferred quasi-polar method used in the step 1730 is described with regard to FIG. 13.

Preferably, before computing the FFT in the step 1720, the image values (intensities) near the image edges are first attenuated so that the image values fade to zero gradually and smoothly towards the edges of the image. The step 1730 produces a complex image where horizontal rows correspond to radial slices in the two-dimensional FFT that resulted from the step 1720. The angular spacing and the radial scaling need not be constant.

In a step 1750, a one-dimensional Fourier transform of a one-dimensional basis function provided by a step 1740 is performed. The basis function provided by the step 1740 is described mathematically as:

$$f(x)=\cos(\gamma \log|x-x_0|)+i \sin(\gamma \log|x-x_0|) \qquad (9)$$

where this equation is a complex version of equation (1). Accordingly, y is a constant that specifies how quickly the pattern oscillates and $x_0$ specifies the symmetry point for the pattern. Alternatively, the basis function from the step 1740 can be mathematically transformed. That is, the analytic solution to the Fourier transform of equation (9) can be derived and used to produce 1750 directly.

Next, the transform of the basis function resulting from the step 1750 is multiplied in a pixel by pixel fashion in a step 1760 with the complex conjugate of the values of the output of the step 1730 along horizontal rows (that represent radial lines in the two-dimensional FFT) for all angle values. The resultant complex pixel values are then normalized by the step 1760 so that they have, at most, unit magnitude. A step 1770 then determines a one-dimensional Inverse Fast Fourier Transform (IFFT) of the output of the step 1760 along horizontal rows.

The result of the step 1770 is a complex image which has peaks in image magnitude corresponding to the orientation and scale of the 1-D basis functions (i.e. the four alignment marks) within the scanned document signal 120 in FIG. 2. These peaks are detected using a peak detection process 1780 (that is described in more detail in regard to FIG. 14). Finally, in a step 1790 the location of the peaks detected in the step 1780 are used to determine the affine parameters that relate the scanned document at 120 in FIG. 2 to the digital form of the cipher fields 115' and 116' in FIG. 2.

In the step 1790, the affine transformation corresponding to the combination of 4 peaks that gives the best least squares fit to an affine transformation of the intersection points is selected as the affine transformation that relates the orientation of the scanned document at 120 in FIG. 2 to the orientation of the cipher fields 115' and 116' in FIG. 2. The details of the least squares fit are described in a later section.

The affine transform is then used in step 2402 of FIG. 4 to transform the scanned document, using bi-cubic interpolation. This forms the signal 121 (see FIG. 2) that represents the coarsely aligned scanned document. This document has a resolution, in the present example, of approximately 600 DPI.

Details of the Quasi-Polar Mapping Process

In the described arrangement, the preferred method of performing the invariant pattern matching for coarse alignment uses the Chirp-Z transform to provide a quasi-polar transform (see the step 1730 in FIG. 12) of the Fourier transform performed by the step 1720. The Chirp-Z transform is a method for computing a scaled portion of a Fourier Transform of a signal.

Figure 13:
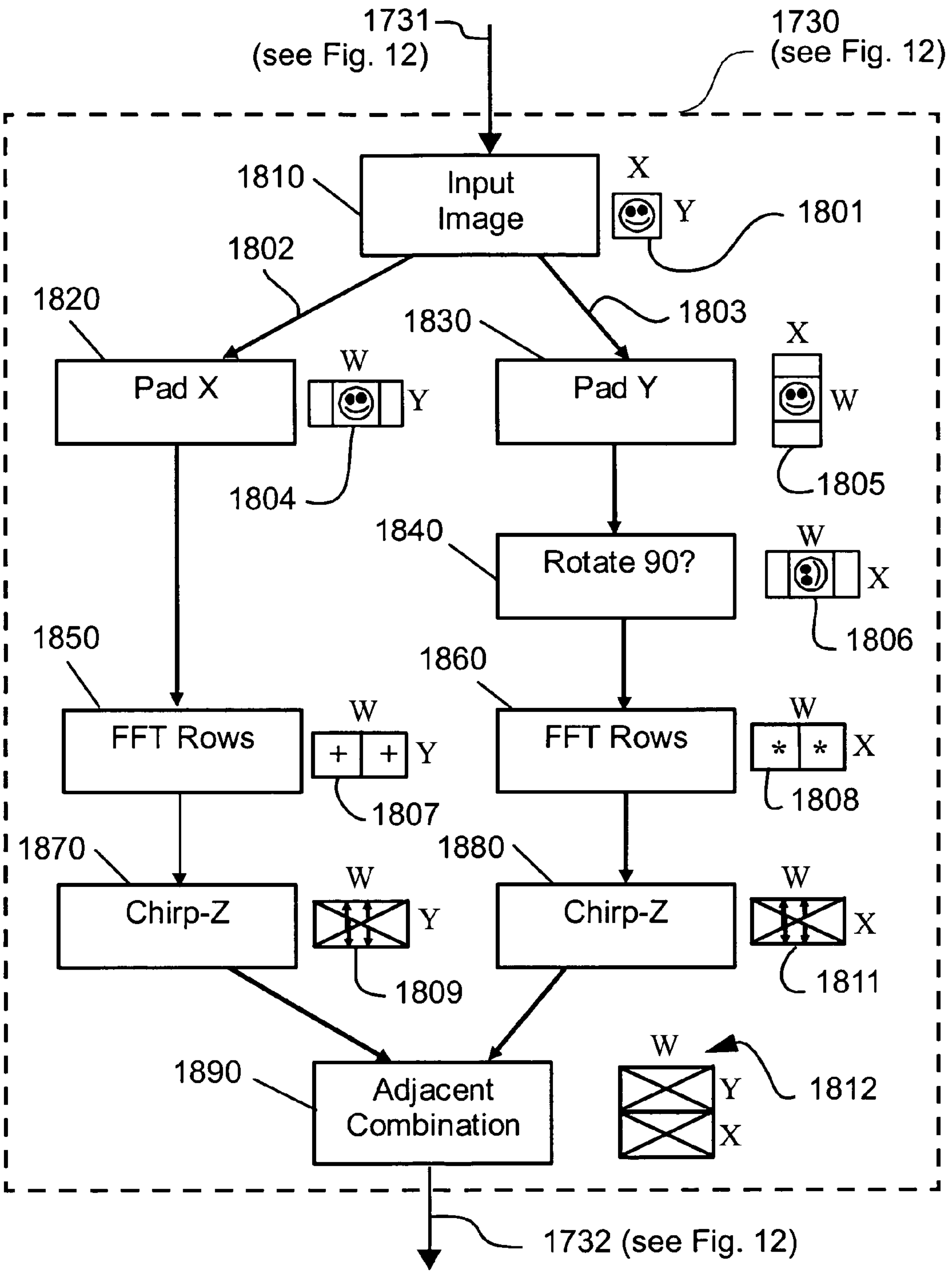
FIG. 13 shows the quasi-polar transform process of FIG. 12 in more detail.

FIG. 13 shows the step 1730 of FIG. 12 in more detail. FIG. 13 shows a process for performing a quasi-polar transform in order to calculate a quasi-polar mapping of a Fourier Transform. In a step 1810 the resized image 1801 having size (X, Y), that is output by the step 1720 of FIG. 12, is replicated into two copies I1 and I2 (referred to by respective reference numerals 1802 and 1803). In a step 1820, the first copy I1 is padded with zeros in the X direction to a width of W=2*MAX (X,Y), resulting in an image 1804 of size (W,Y). The padding is performed so that column offset $\lfloor X/2 \rfloor$ in I1 corresponds to column offset $\lfloor W/2 \rfloor$ in the padded image 1804.

In a step 1830, the second copy I2 is padded with zeros in the Y direction to a height of W to form an image 1805, and in a step 1840 the image 1805 is rotated by 90 degrees resulting in an image 1806 of size (W,X). The padding is performed so that row offset $\lfloor Y/2 \rfloor$ in I2 corresponds to row offset $\lfloor W/2 \rfloor$ in the padded image 1806.

In steps 1850 and 1860, the images 1804 and 1806 are transformed by computing the one-dimensional Fourier transform of each row to respectively form the transformed images 1807 and 1808.

In steps 1870 and 1880, the images 1807 and 1808 are transformed by computing individual chirp-Z transforms on each of the columns to form the transformed images 1809 and 1811.

Each chirp transform performed by the steps 1870 and 1880 is performed to preserve the centre position of each column, at positions $\lfloor Y/2 \rfloor$ and $\lfloor X/2 \rfloor$ within the columns for the steps 1870 and 1880 respectively.

The scaling factors $m_z$ for each column z in the steps 1870 and 1880 are $$m_z=\lfloor W/2 \rfloor (z-\lfloor W/2 \rfloor) \qquad (10)$$

Each scale factor $m_z$ is negative for $z<\lfloor W/2 \rfloor$, corresponding to a vertical flip. Where the scaling factor is undefined for $z=\lfloor W/2 \rfloor$, the central pixel position is replicated across the whole column.

Assuming a square image from the tamper-evident document 105, the transformed images 1809 and 1811 represent quasi-polar transforms of the Fourier Transforms of the resized, windowed input image, with 1809 having angles within the range [−π/4 . . . π/4], and 1811 having angles in the range [π/4 . . . 3π/4]. If the image from the tamper-evident document 105 is rectangular, the angular ranges will be from [−atan 2(Y,X) . . . atan 2(Y,X)] and [atan 2(Y,X) . . . π-atan 2(Y,X)]. Because each row of the quasi-polar transform contains positive and negative radii, it has all angles within [0 . . . 2π] radians.

In a step 1890, the two input images 1809 and 1811 are combined to form an image, 1812, of dimension (W,Y+X), by replicating the pixels of image 1809 into the top part of 1812 and replicating the pixels of image 1811 into the bottom part of 1812.

Details of the Peak Detection Process

Figure 14:
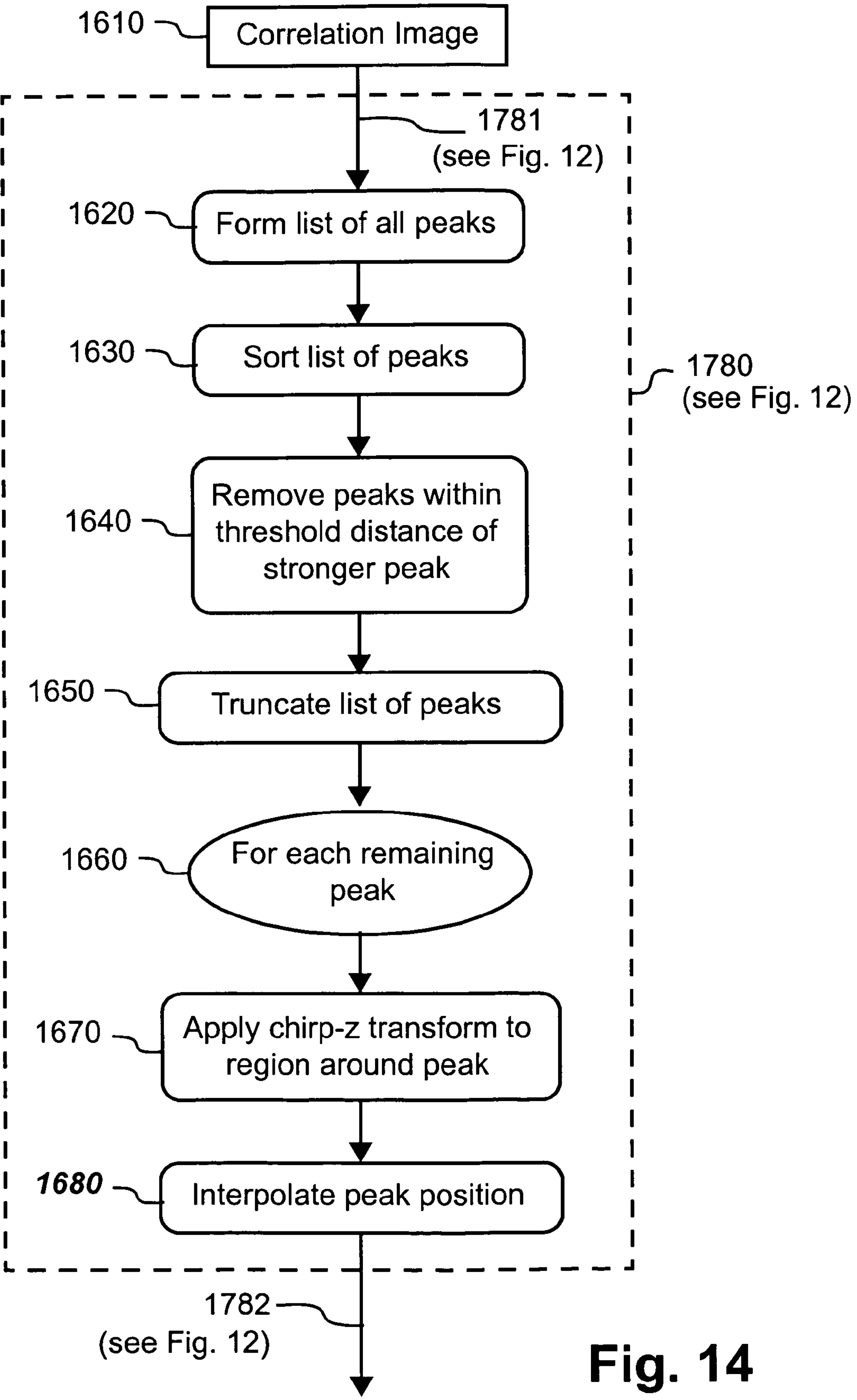
FIG. 14 shows the peak detection process of FIG. 12 in more detail.

FIG. 14 is a flow diagram showing one example of the peak detection process 1780 in FIG. 12. The result of the step 1770 in FIG. 12 is a complex image which has peaks in image magnitude corresponding to the orientation and scale of the 1-D basis functions (i.e. the four alignment marks) within the scanned document signal 120 in FIG. 2. The input to the peak detection step 1780 is thus referred to as a correlation image 1610, which is the aforementioned complex image in which we wish to find the location of the highest P peaks (in the preferred arrangement, P is 64), or in other words the P highest local maxima of the magnitude of the correlation image.

Peaks may occur in noisy regions where there are many peaks clustered close together. It is preferable to only consider the largest peak within a certain radius threshold, and a default radial threshold of 10 pixels is chosen. In a step 1620, the correlation image 1610 is scanned and a list of points where the magnitude of the pixel value is greater than all of its neighbours is constructed. In a next step 1630, this list of peaks is sorted in order of the magnitude of the pixel values. In a next step 1640, each peak in the sorted list is considered in decreasing order of magnitude, and any peak that is after it on the list that is within the radial distance threshold is removed from the list. In a next step 1650, the sorted list of peaks produced by the step 1640 is truncated to a list P in length.

The aforementioned truncated list contains the locations of the P peaks that can be found with high precision. In a step next 1660, a loop is entered that takes each of the P peaks in turn, and in a following step 1670 a 27 pixel by 27 pixel region centred on the location of the peak being considered is input to an FFT and then input into a chirp-z transform which zooms in on the peak by a factor of 27. The chirp-z transform allows computation of the discrete Fourier transform (DFT or the inverse DFT) with arbitrary spacing. The chirp transform is performed by expressing the DFT as a discrete, cyclic convolution. Because such convolutions can be implemented using FFTs it is possible for the entire computation to take advantage of the FFT speed. By suitable choice of spacing, the chirp-z transform becomes an interpolation technique, so that, for example, a DFT can be finely sampled (that is to say zoomed) over a selected region.

The pixel in this 27 by 27 image with the highest magnitude is determined in a following step 1680, and the sub-pixel location of this peak is determined using a biparabolic fit. This sub-pixel accurate peak location is the output of the peak detection step 1780.

Using the Detected Peaks to Determine Coarse Alignment

The peaks output from the step 1780 in FIG. 14 (see also FIG. 12) are then further processed by the step 1790 in FIG. 12 by selecting, in turn, each possible combination of 4 peaks and performing the following analysis, keeping track of which combination of 4 peaks best satisfies the conditions of this analysis.

The radius and angle of each peak $s_i$ and $\beta_i$ are computed from its (x, y) offset in the quasi-polar map 1812 in FIG. 13.

This conversion from of quasi-polar coordinates in 1813, (x, y), to polar coordinates (s,β) is computed as follows:

The input image, 1812 is of size (W, X+Y) pixels, and the following parameters are set:

$$Y_2 = \lfloor Y/2 \rfloor \quad X_2 = \lfloor X/2 \rfloor \quad W_2 = \lfloor W/2 \rfloor \tag{11}$$

$$\text{If } y < Y,\quad y_s = y - Y_2,\quad x_s = x - W_2,\quad \beta = \pi/2 - \tan^{-1}\frac{Y_2}{y_s},\quad s = \frac{x_s Y_2}{\sqrt{Y_2^2 + y_s^2}} \tag{12}$$

$$\text{else if } y >= Y,\quad y_s = x - W_2,\quad x_s = y - X_2,\quad \beta = \pi - \tan^{-1}\frac{X_2}{x_s},\quad s = \frac{y_s X_2}{\sqrt{X_2^2 + x_s^2}} \tag{13}$$

where $Y_2$, $X_2$, $W_2$, $y_s$ and $x_s$ are intermediate values.

An affine transformation described by linear transformation parameters ($a_{11}$, $a_{12}$, $a_{21}$, $a_{22}$, $x_0$, $y_0$) that maps the original set (from equation (3) and reproduced at equation (14) for convenience) of one-dimensional basis function parameters $r_i$ and $\alpha_i$ to parameters $s_i$ and $\beta_i$ is determined from the 4 selected peaks. The pre-defined set of one-dimensional basis function parameters used in the security document 105 with alignment mark embedded are reproduced from (3) as follows:

$$r_1 = P_d,\ \alpha_1 = \frac{9}{16}2\pi \quad r_2 = P_d,\ \alpha_2 = \frac{13}{16}2\pi \quad r_3 = P_d,\ \alpha_3 = \frac{3}{16}2\pi \quad r_4 = \frac{P_d}{\sqrt{2}},\ \alpha_4 = \frac{15}{16}2\pi \tag{14}$$

with $$P_d = N/(2+\sqrt{2}) \tag{15}$$

where N is 1024.

This set of parameters has been specially chosen so that the symmetry axes of the one-dimensional basis functions they represent intersect at points that define line segments that have certain ratios of lengths that are invariant under affine transformations.

The first condition that the combination of 4 peaks must satisfy is that they generate sets of line segments with the correct length ratios (eg see 1101:1102 in FIG. 11). If they do not generate sets of line segments with the correct length ratios then the combination of peaks does not correspond to the four original basis patterns modified by an affine transform and this combination can be discarded.

As previously described, the radial and angular coordinates of a peak, $s_i$ and $\beta_i$, describe the axis of symmetry of one of the one-dimensional scale invariant patterns embedded in the security document. Rather than determine the affine transform applied to the image through the changes in these line parameters directly, the affine transform is determined from the intersection points of the 4 axes of symmetries specified by the 4 selected peaks. The intersection of two axes of symmetry lines $\{s_k, \beta_k\}$ and $\{s_m, \beta_m\}$ is labelled $(x_{km}, y_{km})$, and is given by the matrix equation (16) as follows:

$$\begin{pmatrix} x_{km} \\ y_{km} \end{pmatrix} = \frac{1}{\sin(\beta_k - \beta_m)} \begin{pmatrix} \sin\beta_k & -\sin\beta_m \\ \cos\beta_k & \cos\beta_m \end{pmatrix} \begin{pmatrix} s_m \\ s_k \end{pmatrix}. \quad (16)$$

There is no intersection if the lines are parallel, and so the equivalent constraint $\sin(\beta_k-\beta_m)\neq 0$ is imposed. In practical situations $\sin^2(\beta_k-\beta_m)\geqq 0.25$ is sufficient to ensure good localization of the intersection point. The parametric equation of a line specifies the linear distance of any point on that line relative to the perpendicular bisector of that line that passes through the origin. In the current case of four mutually non-parallel lines, each line has three intersection points along its length (eg see points 1103-1105 for the line 3 in FIG. 11) and the ratio of the intersection intervals (1101:1102 for the line 3 in FIG. 11) remains invariant to affine distortions. The distance $\lambda_{km}$, along the $k^{th}$ line where the $m^{th}$ line intersects, is given by $$\lambda_{km} = \frac{s_k\cos(\beta_k - \beta_m) - s_m}{\sin(\beta_k - \beta_m)}. \quad (17)$$

The above equation (17) is then enumerated for all combinations $\lambda_{km}$, all k≠m and a table (18) generated which contains the locations along lines as follows:

$$\begin{bmatrix} - & \lambda_{12} & \lambda_{13} & \lambda_{14} \\ \lambda_{21} & - & \lambda_{12} & \lambda_{24} \\ \lambda_{31} & \lambda_{32} & - & \lambda_{34} \\ \lambda_{41} & \lambda_{42} & \lambda_{43} & - \end{bmatrix} \quad (18)$$

The parameters in (18) are then ordered by size as follows: $\{\lambda_{km}\}_{max}>\{\lambda_{km}\}_{mid}>\{\lambda_{km}\}_{min}$, m=1→4 of each line k, in order to thus find the length ratios $R_k'$ as shown in (19) as follows:

$$R_k' = \min\left[\frac{\{\lambda_{km}\}_{max} - \{\lambda_{km}\}_{mid}}{\{\lambda_{km}\}_{mid} - \{\lambda_{km}\}_{min}}, \frac{\{\lambda_{km}\}_{mid} - \{\lambda_{km}\}_{min}}{\{\lambda_{km}\}_{max} - \{\lambda_{km}\}_{mid}}\right] \leq 1 \quad (19)$$

This generates 4 ratios from the 4 axes of symmetry. There are also 4 ratios that may be generated from the original set of one-dimensional basis function parameters $r_i$ and $\alpha_i$. If these ratios are denoted as $R_k$ then the error in the ratio measure for the selected set of 4 peaks is defined as:

$$E_{ratio} = \sqrt{\sum_{k=1}^{4} (R_k'/R_k - 1)^2}. \quad (20)$$

If this error is greater than 0.1 this set of peaks is discarded. If it is less than 0.1, a linear least squares fitting model is applied to determine the best fitting affine transform that maps the set of intersection points of the axes of symmetry generated by the 4 selected peaks back to the original set of intersection points of the axes of symmetry of the embedded pattern. The method of finding the best fitting affine transform is described in a later section.

Extracting the Salt Value

Returning to FIG. 4, once the coarse alignment marks have been recovered, and the coarse alignment has been performed according to the steps 2401 and 2402, next the salt is recovered in the step 2422. The peak corresponding to the salt pattern is recovered using the same methods described above for the coarse alignment marks. The strongest detected candidate peak of the basis pattern with the salt oscillation constant $\gamma$ is used and the two 6 bit values recovered from the angle and radius of the detected peak. These are combined to form the 12 bit salt value.

Regenerating the Cipher Fields and a Composite Cipher Alignment Image

Preparatory to the precision alignment step 2403 in FIG. 4, it is necessary to regenerate the cipher fields in the validation sub-system 127 of FIG. 2. This can done in the same manner described in relation to FIGS. 5 and 6, using the original key (see 2501 in FIG. 6), which may be entered by an operator, or known to the validation sub-system 127, or transferred from the production sub-system 126 or by some other means. The original key (used by the step 2501 in FIG. 6) is combined with the salt value (from the step 2508 in FIG. 6) in the same manner as previously described. The cipher fields are then generated by the cryptographic signal sources 102' and 103' in FIG. 2 in the same manner as described in relation to the sources 102, 103. The spatial area of cipher field generation by the sources 102' and 103' can be limited to the equivalent area of the coarsely aligned scanned document 121, as determined by the coarse alignment steps 2401-2402 (see FIG. 4) that is performed by the coarse alignment and salt recovery module 113 in FIG. 1.

Next, colour image versions of the cipher fields generated by the sources 102', 103' are created in the fine alignment module 106. Each of these colour image versions (referred to as cipher field derived colour grids in relation to FIG. 7) is created by indexing the 2 bit cipher value at each pixel into the colour lookup tables 134, 135 in the same manner as described in relation to FIG. 7. Each resultant colour image version of each cipher field is then up-scaled by a factor of 3 in each dimension by pixel replication to form a 600 DPI image (the same resolution as the scanned document 120). This forms the "full size" colour image versions of the cipher fields. Finally, a composite colour image version of the cipher fields is generated by averaging the two colour image versions of the cipher fields.

Fine Alignment by Block Based Matching

Figure 15:
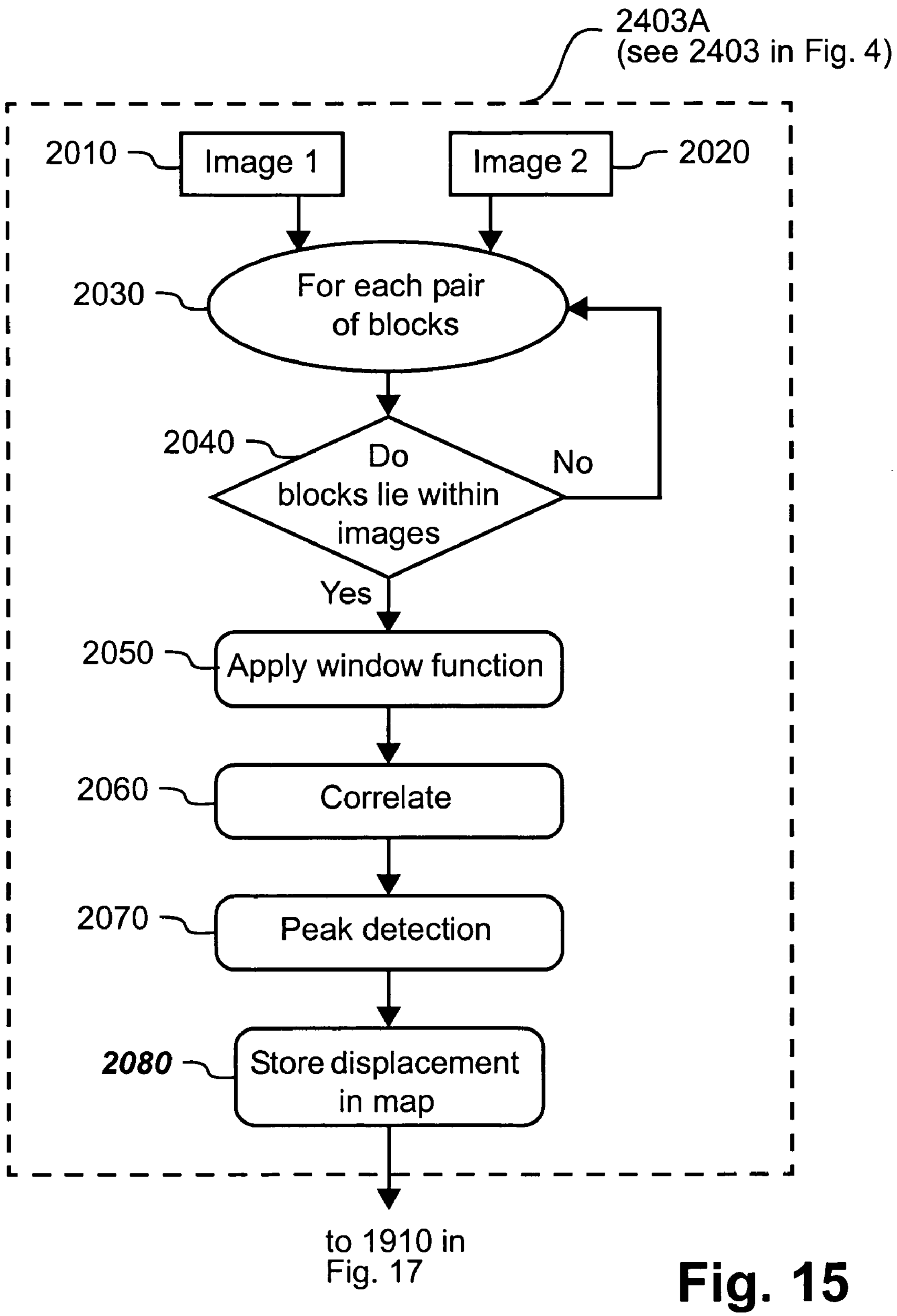
FIG. 15 shows a block-based correlation sub-process, used to form a displacement map in the fine alignment process of FIG. 4.

FIG. 15 shows the block based correlation sub-process 2403A used to form a displacement map in the fine alignment process 2403 in FIG. 4. The process 2403A generates a displacement map D that represents the warp (i.e. the fine grain deliberate pre-distortion) that is required to map the pixels of the coarsely aligned scanned document at 121 in FIG. 2 to the respective pixel positions of the colour cipher fields. This warping takes account of distortion that may have taken place in the coarsely aligned scanned document because of the print/scan operations performed by the printer 2215 in printing the tamper-evident document 105, and by the scanner 2218 in scanning the document 105 to produce the tamper-evident signal 120. This warping constitutes part of the fine alignment of the coarsely aligned document 121 and the cipher fields 115' 116'.

The block based correlation process 2403A receives as inputs (a) the coarsely aligned scanned document at 121 in FIG. 2 (referred to as 2010 being image 1 in FIG. 15), which is N pixels wide and M pixels high, and (b) the composite colour image version of the cipher fields (referred to as 2020 being image 2), which is also N pixels wide and M pixels high. As image 1 (i.e. 2010) is the result 121 of the coarse alignment steps 2419 in FIG. 4, the two images 2010 and 2020 are roughly aligned, to within a few pixels of each other.

The block based correlation process 2403A involves selection of a block size Q and a step size P. These sizes can be varied. Larger sizes of Q give more measurement precision, at the expense of averaging it over a larger spatial area (and more computation time). Smaller values of P give more spatial detail, but increase computation time. For the example being considered, Q=256 and P=32. This represents a block 256 pixels high by 256 pixels wide, stepped along the images 2010 and 2020, in both horizontal and vertical directions, in 32 pixel increments.

Figure 16:
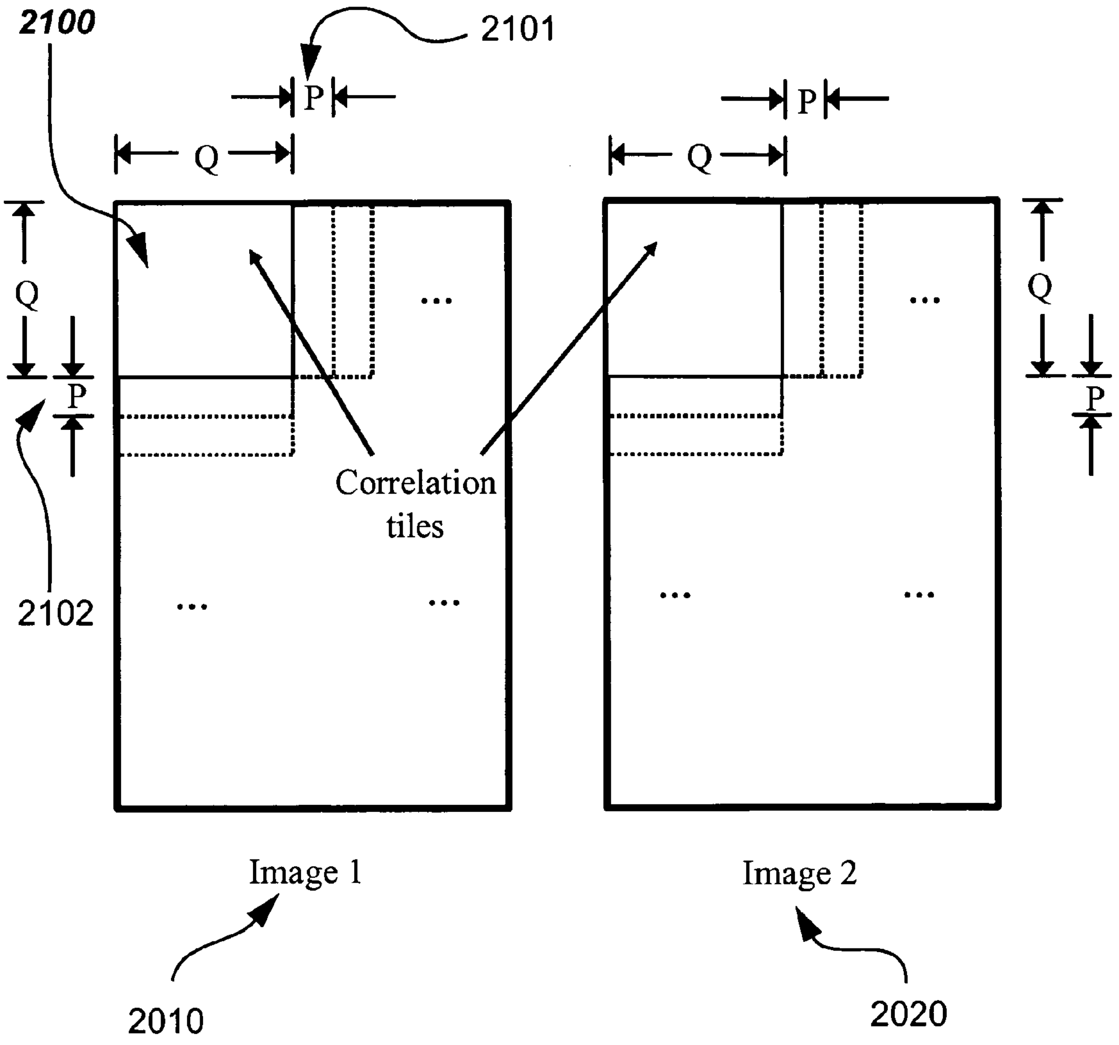
FIG. 16 illustrates block and step size in the block correlation process of FIG. 15.

FIG. 16 depicts the choice of blocks for correlation, and is an illustration of the block size and step size of the blocks in the block correlation process 2403A. A correlation block 2100 is shown on the Image 1 (i.e. 2010). The block 2100 has horizontal and vertical dimensions "Q". The block 2100 is stepped in the horizontal direction in increments "P" (referred to as 2101) and in the vertical direction in increments "P" (referred to as 2102).

Returning to FIG. 15, the output of the block based correlation process 2403A at the step 2080 is the displacement map "D". The displacement map D is a raster image whose dimensions are defined by (21) as follows:

$$D_x=\lfloor(N+Q-1)/P\rfloor$$

by $$D_y=\lfloor(M+Q-1)/P\rfloor \quad (21)$$

where: $D_x$ is the horizontal dimension, $D_y$ is the vertical dimension, N is the width of the image 2010 in pixels, M is the height of the image 2010 in pixels, and Q is the selected block size.

The number of elements is Dx*Dy. P is fixed. Each element of the displacement map D comprises a displacement vector and a confidence estimate. Each displacement vector and confidence estimate in the displacement map D is the result of a block correlation.

Processing of the images 2010 and 2020 begins by entering a loop in a step 2030 over all correlation blocks BP and Bq from the images 2010 and 2020 where the correlation block subscripts "p" and "q" vary over $[0 \ldots D_x-1]$ and $[0 \ldots D_y-1]$ respectively. For a given pair of blocks $B_m$ and $B_n$ from the respective images 2010 and 2020, and considering a pixel (i, j) in the displacement map D, the block $B_m$ and the block $B_n$ each have their upper left pixel at a pixel offset from the pixel (i, j) expressed at (22) as follows:

$$(\lfloor N/2\rfloor+(i-\lfloor D_x/2\rfloor)P-\lfloor Q/2\rfloor, \lfloor M/2\rfloor+(j-\lfloor D_y/2\rfloor)P-\lfloor Q/2\rfloor) \quad (22)$$

where the first term in (22) represents the offset in the horizontal direction, and the second term represents the offset in the vertical direction.

In a following step 2040, a check is performed to see if the selected blocks $B_m$ and $B_n$ lie wholly within their respective images 2010 and 2020. If this is not the case, the confidence estimate for pixel (i, j) in D is set to 0 and the loop continues. If however the blocks $B_m$ and $B_n$ do lie wholly within their respective images 2010 and 2020, then a following step 2050 generates Yuv colour space versions of the (RGB) blocks $B_m$ and $B_n$. The step 2050 then treats the u as a real components and the v as the imaginary components from the corresponding Yuv blocks to form respective new complex images $B''_m$ and $B''_n$ from the blocks $B_m$ and $B_n$. The new blocks $B''_m$ and $B''_n$, being based on the u and v values, reduce the effect of the major component which is primarily confined to the Y component of the Yuv colour space. The step 2050 further multiplies the new blocks $B''_m$ and $B''_n$ by a window function to form respective windowed blocks $B'_m$ and $B'_n$. The described arrangement uses a Hanning window squared in the vertical direction and a Hanning window squared in the horizontal direction. A following step 2060 then phase correlates the two windowed blocks $B'_m$ and $B'_n$.

The correlation step is performed using phase correlation, in which the FFT of the block $B'_m$ is multiplied by the complex conjugate of the FFT of the block $B'_n$, and the result of this multiplication, referred to as $B^{ph}_{mn}$, is normalised to have a maximum of unit magnitude, the normalised result being referred to as $B^{phn}_{mn}$. The step 2050 then applies an inverse FFT to $B^{phn}_{mn}$ to form a correlation block referred to a "C".

The correlation block C is a raster array of dimension Q by Q (for the present example) of complex values that is then input to a peak detection step 2070. The step 2070 is similar in operation to the peak detection step 1780 in FIG. 12. The step 2070 determines the location of the highest peak in the correlation block C, relative to the centre of the block C, to sub-pixel accuracy. In a step 2080 this sub-pixel accurate location relative to the centre of the block C is stored in the displacement map D at location (i, j) along with the square root of the peak height as a confidence estimate of the result of the correlation. The loop 2030 continues until there are no blocks left to process.

Next, as will be described in relation to FIG. 17, an interpolation process 2403B takes the displacement map D that is output from the block correlation sub-process 2403A of FIG. 15 and forms a distortion map D'. The distortion map D' relates each pixel in the coarsely aligned scanned document 121 to a pixel in the coordinate space of the cipher fields. Some parts of the distortion map D' may map pixels in the coarsely registered document 121 to pixels outside the boundary of the cipher fields. This is because the imaging device may not have imaged the entire document.

Figure 17:
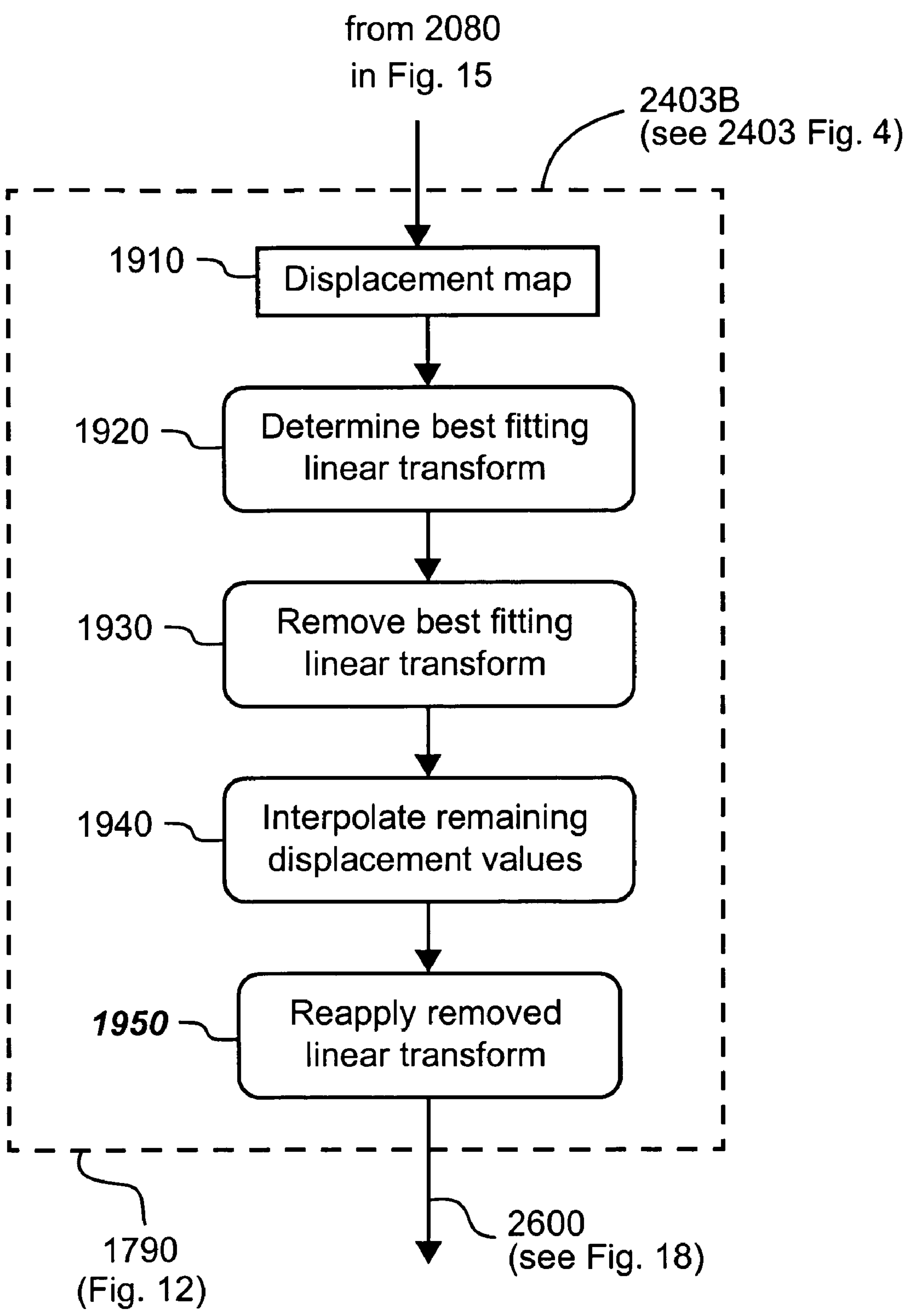
FIG. 17 shows an interpolation sub-process, used to form a distortion map from the displacement map of FIG. 15.

FIG. 17 shows the interpolation process 2430B for interpolating the displacement map D to form the distortion map D'. The interpolation process 2430B receives, at a step 1910, the displacement D map that was stored in the step 2080 of FIG. 15. A following step 1920 takes the displacement map D and determines a set of linear transform parameters, ($b_{11}$, $b_{12}$, $b_{21}$, $b_{22}$, $\Delta x$, $\Delta y$) that best fit the displacement map D.

An arbitrary point ($x_{ij}$, $y_{ij}$) in a cipher field (noting that the x,y position of such a point has not suffered positional distortion in contrast to the pixels in the document 121) maps to a corresponding pixel (i, j) in the displacement map D according to the following mathematical relationship:

$$(x_{ij},y_{ij})=(\lfloor N/2\rfloor+(i-\lfloor D_x/2\rfloor)P, \lfloor M/2\rfloor+(j-\lfloor D_y/2\rfloor)P). \quad (23)$$

The cipher field point is displaced using the displacement map to yield corresponding displaced cipher field point coordinates ($\hat{x}_{ij}$, $\hat{y}_{ij}$) by performing the following operation:

$$(\hat{x}_{ij},\hat{y}_{ij})=(x_{ij},y_{ij})-D(i,j), \quad (24)$$

where D(i, j) is the displacement vector part of the displacement map D for the pixel (ij) being considered.

The linear transformation parameters ($b_{11}$, $b_{12}$, $b_{21}$, $b_{22}$, $\Delta x$, $\Delta y$) when applied to the undistorted points ($x_{ij}$, $y_{ij}$) yield affine transformed points ($\tilde{x}_{ij}$, $\tilde{y}_{ij}$) as follows:

$$\begin{pmatrix} \tilde{x}_{ij} \\ \tilde{y}_{ij} \end{pmatrix} = \begin{pmatrix} b_{11} & b_{21} \\ b_{12} & b_{22} \end{pmatrix}\begin{pmatrix} x_{ij} \\ y_{ij} \end{pmatrix} + \begin{pmatrix} \Delta x \\ \Delta y \end{pmatrix}. \quad (25)$$

The best fitting affine transformation is determined by minimising the error between the displaced coordinates ($\hat{x}_{ij}$, $\hat{y}_{ij}$), and the affine transformed points ($\tilde{x}_{ij}$, $\tilde{y}_{ij}$) by changing the affine transform parameters. The error functional to be minimised is the Euclidean norm measure E that is defined as follows:

$$E = \sum_{n=1}^{N} (\hat{x}_n - \tilde{x}_n)^2 + (\hat{y}_n - \tilde{y}_n)^2 \quad (26)$$

The minimising solution is given by the following:

$$\begin{pmatrix} b_{11} \\ b_{12} \\ \Delta x \end{pmatrix} = M^{-1}\begin{pmatrix} \sum \hat{x}_n x_n \\ \sum \hat{x}_n y_n \\ \sum \hat{x}_n \end{pmatrix} \quad (27)$$

$$\begin{pmatrix} b_{21} \\ b_{22} \\ \Delta y \end{pmatrix} = M^{-1}\begin{pmatrix} \sum \hat{y}_n x_n \\ \sum \hat{y}_n y_n \\ \sum \hat{y}_n \end{pmatrix}$$

with $$M = \begin{pmatrix} S_{xx} & S_{xy} & S_x \\ S_{xy} & S_{yy} & S_y \\ S_x & S_y & S \end{pmatrix} = \begin{pmatrix} \sum x_n x_n & \sum x_n y_n & \sum x_n \\ \sum y_n x_n & \sum y_n y_n & \sum y_n \\ \sum x_n & \sum y_n & \sum 1 \end{pmatrix} \quad (28)$$

$$M^{-1} = \frac{1}{|M|}\begin{pmatrix} -S_y S_y + S S_{yy} & -S S_{xy} + S_x S_y & S_{xy} S_y - S_x S_{yy} \\ -S S_{xy} + S_x S_y & -S_x S_x + S S_{xx} & S_x S_{xy} - S_{xx} S_y \\ S_{xy} S_y - S_x S_{yy} & S_x S_{xy} - S_{xx} S_y & -S_{xy} S_{xy} + S_{xx} S_{yy} \end{pmatrix} \quad (29)$$

and $$|M| = \det M = -S S_{xy} S_{xy} + 2 S_x S_{xy} S_y - S_{xx} S_y S_y - S_x S_x S_{yy} + S S_{xx} S_{yy} \quad (30)$$

where the sums are carried out over all displacement pixels with non-zero confidence estimates on the displacement vectors in the displacement map D.

A following step 1930 removes the best fitting linear transformation from the displacement map by replacing each displacement map pixel as follows:

$$D(i,j) \rightarrow D(i,j) - \begin{pmatrix} b_{11} & b_{21} \\ b_{12} & b_{22} \end{pmatrix}\begin{pmatrix} x_{ij} \\ y_{ij} \end{pmatrix} - \begin{pmatrix} \Delta x \\ \Delta y \end{pmatrix}. \quad (31)$$

A following step 1940 then interpolates the displacement map, after the best fitting linear transform has been removed by using bi-cubic interpolation, to a displacement map of dimension $D_x P$ by $D_y P$. A complication can arise in the interpolation step if the displacement map has a pixel with zero confidence in the neighbourhood of the bicubic interpolation kernel. If this occurs, the pixel with zero confidence is itself substituted by an estimated value using an average of neighbouring pixels weighted by their confidence value. If no neighbouring pixels have positive confidence, a region growing algorithm is used to determine the pixel value. The interpolated displacement pixel is then computed using bicubic interpolation using the pixels with positive confidence along with the substituted pixels in the displacement map.

A following step 1950 reapplies the previously removed best fit linear distortion to the interpolated displacement map D' as follows:

$$D'(i,j) \rightarrow D'(i,j) + \begin{pmatrix} b_{11} & b_{21} \\ b_{12} & b_{22} \end{pmatrix}\begin{pmatrix} x_{ij} \\ y_{ij} \end{pmatrix} + \begin{pmatrix} \Delta x \\ \Delta y \end{pmatrix} \quad (32)$$

where in this case $$(x_{ij}, y_{ij}) = (\lfloor N/2 \rfloor + (i/P - \lfloor D_x/2 \rfloor)P, \lfloor M/2 \rfloor + (j/P - \lfloor D_y/2 \rfloor)P). \quad (33)$$

The map D'(i, j) is the distortion map and forms the output from the step 1950 in the interpolation process 2403B.

Image Warping for fine Alignment

Figure 18:
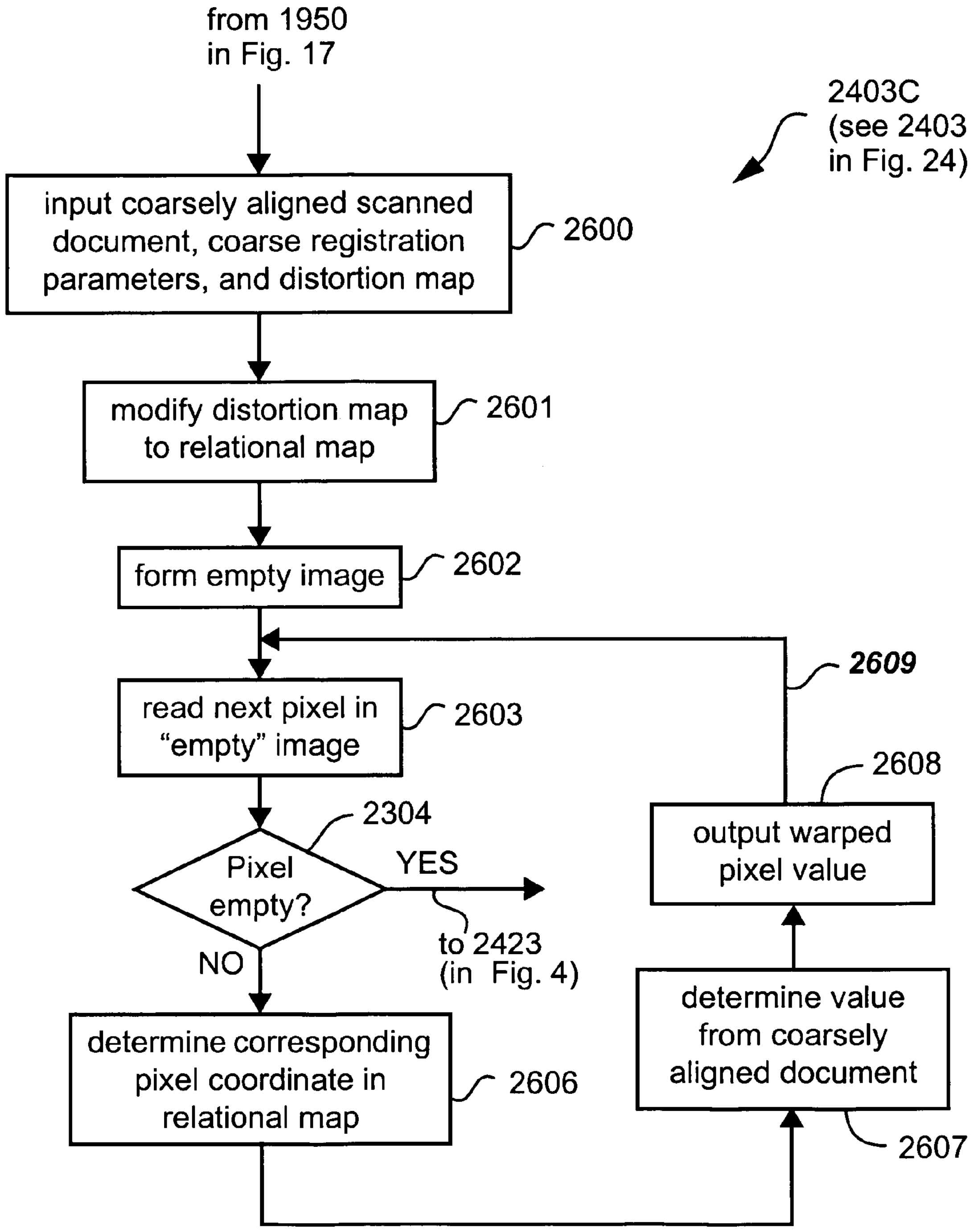
FIG. 18 shows a warping process, used to form the finely aligned document from the displacement map of FIG. 17.

FIG. 18 shows the warping process 2403C that is used to form the finely aligned document from the distortion map D' from the step 1950 of FIG. 17. The image warping process 2403C takes as inputs the scanned document 121, the affine transformation parameters generated by the coarse registration process in step 1790 of FIG. 12 and the distortion map D' from the step 1950 in FIG. 17, and outputs a warped form of the scanned document, which is referred to as the precisely aligned scanned document, that is accurately registered to the colour cipher fields. The first step 2601 in the image warping process 2403C modifies the distortion map D' to a relational map $D'^c$ relating pixels in the cipher fields to pixels in the scanned document 121. This is done by adding the affine transformation determined in the coarse registration step (step 1790 of FIG. 12) back into the distortion map D' by performing the following:

$$D'(i,j) \rightarrow D'(i,j) + \begin{pmatrix} a_{11} & a_{21} \\ a_{12} & a_{22} \end{pmatrix}\begin{pmatrix} x_{ij} \\ y_{ij} \end{pmatrix} + \begin{pmatrix} x_0 \\ y_0 \end{pmatrix}. \quad (34)$$

where ($a_{11}$, $a_{12}$, $a_{21}$, $a_{22}$, $x_0$, $y_0$) are the affine transformation parameters determined in the coarse registration step.

Thereafter, still in the step 2601, pixels in the scanned document 121 corresponding to pixels in the cipher fields are identified by (a) using this relational map $D'^c$ to determine, for each pixel in the scanned document 121, the sub-pixel location on the scanned document 121 that corresponds to the pixel position in the cipher fields, and (b) interpolating the scanned document 121 at that location using bi-cubic interpolation.

A following step 2602 forms an empty image $I^e$ that is the same size as the coarsely aligned scanned document 121. Thereafter a step 2603 reads the next pixel in the aforementioned empty image $I^e$. A following decision step 2304 tests whether all pixels in $I^e$ have been processed. If this is the case, then the process 2403C is directed according to a YES arrow, this being the arrow 2423 in FIG. 4, to output the finely aligned document at 2423 (see FIG. 4). If on the other hand unprocessed pixels remain in $I^e$, then the process 2403C is directed from the step 2304 by a "NO" to a step 2606.

In the step 2606, for the pixel being considered in the empty image $I^e$, an (x, y) coordinate is taken from the corresponding pixel in the relational map $D'^c$. Thereafter, a step 2607 uses this (x, y) coordinate to calculate, by bicubic interpolation, the corresponding "true" pixel value from the coarsely aligned scanned document 121. A following step 2608 writes the warped (true) pixel value into $I^e$ to form, in relation to the pixel in question, the precisely aligned scanned document. The process 2403C is then directed by an arrow 2609 back to the step 2603. It is noted that $I^e$ contains several components, in particular red, green, blue intensity components.

The 600 DPI precisely aligned scanned document $I^e$ and the colour image cipher fields are reduced to 200 DPI by sampling the middle pixel of each 3×3 block. This avoids pixels which have some mixed colour values between 200 DPI pixels.

Verifying the Precisely Aligned Scanned Document

FIG. 19 shows an illustrative example of tamper detection. The pixel 801 forms part of a precisely aligned scanned document 812 (at 123 or 124 of FIG. 2). Four pixels 802 have been altered from the comparable original pixels 709 shown in the tamper-evident document 705 in FIG. 8. An unauthorised person has thus changed the two pairs of pixels 802 to change the letters "EF" in FIG. 8 to "FE" in FIG. 19.

As a first step, the precisely aligned scanned document 812 is subjected, as depicted by an arrow 813, to a threshold operation in a threshold module 107 which considers the luminance value of each pixel. Pixels below 50% luminance are classified as black, and the remaining pixels are classified as white. An image 804, purporting to be the original source image (not shown) is produced as the result of the threshold operation.

Next colour image version cipher fields 805, used in the original encoding of the document 802 are reproduced in sufficient area to cover the precisely aligned scanned document 812. This is done by using the original key from the step 2501 in FIG. 6, which may be entered by an operator, or known to the validation sub-system 127, or transferred from the production sub-system 126 or by some other means. The original key is combined with the salt value from the step 2508 in FIG. 6.

Next the value 814 of each pixel in the threshold image 804 is used to control selection by a selection module 109. Under this control 814 the selection module 109 selects a pixel value 816 or 815 from the one colour image version cipher field or the other, to produce a reference image 807. This is the equivalent process used in the encoding process. For each such selected pixel (eg 807) in the reference image, a comparison is made in a comparison module 108 between the selected pixel, in this example the pixel 807, and the corresponding pixel from the aligned scanned image, in this case the pixel 801. If the minor components of the colors of the pixels 807 and 801 fail to match within a required tolerance, the pixel is defined to have been tampered with from its original condition. According to one arrangement, a pixel is considered to have failed to meet the "match" condition if any of its colour components is more than 25% different from a typical correct value for the given color measured in a linear RGB color space. A typical correct value for each color can be determined by scanning a sample color patch of that color, or based merely on an estimated value. This information, along with the thresholded image, is used to build a new verification image 809. In the described example pixels 810 are reproduced in magenta, while all other pixels are either black or white according to the thresholded image.

There is a possibility that a pixel that has been tampered with will, by chance, have the same color as the appropriate random field (comprising the minor component) at that point and thus not be revealed. This is illustrated in 811 where a pixel that was changed from white to black, is nonetheless not flagged as an alteration in the verification image. In the described arrangement, typically up to 25% of altered pixels can be failed to be detected. This derives from the fact that the cipher fields use 2 bits of precision. The 75% of pixels that are detected is normally more than sufficient to alert a user to the presence and nature of an alteration. Thus over large areas (for example, areas with more pixels than the number of bits in the 52 bit key) the difficulty of making fraudulent undetectable alteration approaches proportionality to the key space size.

The final verification image 809 is typically printed on a color printer for examination by an operator. However, it may also be subject to automatic analysis based on the number of altered pixels or the presence of dense regions of altered pixels.

The revelation of altered pixels is both specific and fine scaled, occurring as it does at the scale of pixels of the original document 708. The revelation is also blind to the original document 708, requiring as it does only the suspect document 812 and the original key to reveal these alterations.

A substantial advantage of the described method is that revelation of alteration of one sub-section of the document 812 is independent of remaining parts of the document 812. It will be noted that the coarse alignment and salt information are incorporated into the document using a technique that provides for very wide dispersal of the information in both spatial and frequency domains with sufficient signal strength to achieve a high degree of redundancy. This means that these signals can be recovered from any sub section of the document 812 without reference to the remainder of the document 812. In the described arrangement recovery of these signals from any 25% of the area of the document is easily achievable. It will be noted that the precision alignment and verification steps also provide for local processing and a high degree of robustness against missing sections. Thus overall the system provides a method of authentication that is highly flexible (applicable to the full area of any document without special arrangement) and robust against partial transfer or incidental document damage.

Using the Marking Process in a Printer Driver

The anti-tampering approach may be incorporated as part of a printer driver on a general purpose computer, such as a Microsoft Windows based computer. In this arrangement the printer driver properties are provided with a user interface element that an operator may select to enable the anti-tampering approach, and a second user interface element where the key (or password) may be entered. In one variation of this arrangement, the printer driver includes the rasterisation process that turns the application data into a ready-to-print image. At this stage the ready-to-print image is modified by the printer driver as described in the anti-tampering approach, and the resulting image passed to the printer device.

In a second variation, the anti-tampering approach is carried out within the printer device. This approach can be advantageous because the anti-tampering approach introduces high frequency data into the print data. If the process of transferring data to the printer, or the internal processes of the printer employ image compression, the image compression will be rendered less effective by the presence of this high frequency data. However if the anti-tampering approach is carried out after transfer to the printer device, the printer device can add the high frequency data at a later stage of processing, after compression and decompressions is complete.

Using the Marking and Verification in a Multi-Function Copier

Another arrangement of the anti-tampering approach employs the anti-tampering approach as a capability of a multi-function copier such as a Canon IR C3200. In this arrangement the multi-function copier provides a user interface element that enables the anti-tampering approach to be employed as part of a security copy operation. As in the case of the printer driver, a second user interface element allows entry of the key. A document copied with this option enabled is scanned, and the digital scanned image is marked as described above, and the resulting digital image is printed, thus providing a security copy operation. The same, or another, multi-function device also employs a verification feature. This feature is also enabled by a user interface element and a second key entry element. A document copied under the scope of this option will be subject to the verification process described above and the printed document will be the result of the verification process with altered areas revealed in magenta (or other highlighting) while non-altered areas will be reproduced in black and white.

Verifying a Document with a Scanner

Another arrangement of the anti-tampering approach uses a scanner device such as a Canon CanoScan 8000F, connected via a USB interface to a general purpose computer running Microsoft Windows and also running a software application employing the anti-tampering approach process. In this arrangement the software application uses a TWAIN scanner driver to obtain document images from paper documents provided by an operator. Each document image is analysed according to the anti-tampering approach. The results of the validation are displayed on the computer screen for the operator to inspect.

Verifying Large Volumes of Documents with a Sheet-Fed Scanner

Another arrangement of the anti-tampering approach uses a high speed desktop sheet-fed scanner such as a Canon DR-5080C. In this arrangement a large volume of documents are scanned without operator intervention. The validation process is used in synchronisation with the scanning process to discover documents that have alterations. In this arrangement the digital image that is the result of the validation process is examined for small patches that contain more than a threshold of altered pixels. The patch size and threshold can be set by the operator. It is also possible to set different thresholds and patches in different areas of the document and have these areas identified by a form recognition system.

INDUSTRIAL APPLICABILITY

It is apparent from the above that the arrangements described are applicable to the document processing industry.

The foregoing describes only some embodiments of the present invention, and modifications and/or changes can be made thereto without departing from the scope and spirit of the invention, the embodiments being illustrative and not restrictive.

(Australia Only) In the context of this specification, the word “comprising” means “including principally but not necessarily solely” or “having” or “including”, and not “consisting only of”. Variations of the word “comprising”, such as “comprise” and “comprises” have correspondingly varied meanings.

We claim:

1. A method for processing N-level source information to determine if tampering has taken place, the method comprising the steps of:

(a) resolving, in regard to an N-level image of the source information to be recorded, at least one pixel of the image into a major component having N possible values, (b) selecting a pattern element from at least one predetermined pattern, said selection depending upon (ai) the major component and (aii) the position of the at least one pixel in the image;

(c) recording the selected pattern element for said at least one pixel onto a transfer medium to thereby form a secure document;

(d) extracting, from the recorded secure document, a retrieved pattern element for said at least one pixel;

(e) determining a pattern element depending upon (di) a major component extracted from said retrieved pattern element and (dii) the position of the at least one pixel on the recorded document; and (f) comparing the retrieved pattern element and the determined pattern element to thereby determine if the secure document has been tampered with, wherein at least said determining step and said comparing step are performed by a processor.

2. A method according to claim 1, wherein:

the recording step prints the selected pattern element for said at least one pixel onto a print medium;

the extracting step extracts, from the printed document, a scanned pattern element for said at least one pixel;

the determining step determines a pattern element depending upon a major component extracted from said scanned pattern element, and the position of the at least one pixel on the printed document; and the comparing step compares the said scanned pattern element and the said determined pattern element.

3. A method according to claim 1, comprising a further step of:

determining that the major component of the pixel of the recorded document has been tampered with if the said retrieved pattern element does not match the said determined pattern element.

4. A method for processing N-level source information to determine if tampering has taken place, the method comprising the steps of:

(a) resolving, in regard to an N-level image of the source information to be recorded, at least one pixel of the image into a major component having N possible values, and a corresponding randomised minor component, said randomised minor component depending upon (ai) the major component and (aii) a position of the at least one pixel in the image;

(b) recording the major component and the randomised minor component for said at least one pixel onto a transfer medium to thereby form a secure document;

(c) extracting, from the recorded secure document, the major component for said at least one pixel;

(d) determining the corresponding randomised minor component depending upon (di) the extracted major component and (dii) a position of the at least one pixel on the recorded document;

(e) measuring, from the printed document, the printed randomised minor component for said at least one pixel; and (f) determining that the pixel of the printed document has been tampered with if the measured printed randomised minor component does not match the determined randomised minor component, wherein at least said step of determining the corresponding randomized minor component and said step of determining that the pixel of the printed document has been tampered with are performed by a processor.

5. A method according to claim 1, wherein the said at least one predetermined pattern is at least one known sequence based on position.

6. A method according to claim 5, wherein the said at least one predetermined pattern is at least one cipher field.

7. A method according to claim 6, wherein:

(g) the resolving step (a) comprises:

(ga) generating N cipher fields;

(gb) aligning the cipher fields with the N-level image;

(gc) selecting one of the cipher fields dependent upon the value of the major component; and (gd) choosing the pattern element from the selected cipher field dependent upon the position of the at least one pixel in the image;

(i) subsequent to the recording step and prior to the determining step the method comprises the further steps of:

(ia) generating said N cipher fields; and (ib) aligning the cipher fields with the N-level recorded image so that the position of the recorded pixel can be established.

8. A method according to claim 7, wherein:

the aligning step (gb) is performed in a pixel congruent manner with the N-level image; and the aligning step (ib) is performed in a pixel congruent manner.

9. A method according to claim 8, wherein the aligning step (ib) further comprises block correlating the cipher fields with the recorded image.

10. A method according to claim 8 wherein the recording step further comprises recording an alignment mark onto the transfer medium and the alignment mark comprises at least two registration marks.

11. A method according to claim 8 wherein the alignment mark comprises at least one linear corrugated function.

12. A method for recording N-level source information on a secure document, the method comprising the steps of:

(a) resolving, in regard to an N-level image of the source information to be recorded, at least one pixel of the image into a major component having N possible values, (b) selecting a pattern element from a predetermined pattern, the selection of said pattern element depending upon the position of the at least one pixel in the image, wherein the predetermined pattern is selected from a plurality of predetermined patterns based on the major component; and (c) recording the pattern element for said at least one pixel onto a transfer medium to thereby form a secure document, wherein at least said resolving step and said selecting step are performed by a processor.

13. A method according to claim 12, wherein the said at least one predetermined pattern is at least one known sequence based on position.

14. A method according to claim 13, wherein the said at least one predetermined pattern is at least one cipher field.

15. A method according to claim 14, wherein:

(c) the resolving step (a) comprises:

(ca) generating N cipher fields;

(cb) arranging the cipher fields in a pixel congruent manner with the N-level image;

(cc) selecting one of the cipher fields dependent upon the value of the major component; and (cd) choosing the minor component from the selected cipher field dependent upon the position of the at least one pixel in the image.

16. A method for recording N-level source information on a secure document, the method comprising the steps of:

(a) resolving, in regard to an N-level image of the source information to be recorded, at least one pixel of the image into a major component having N possible values, and a corresponding randomised minor component depending upon a position of the at least one pixel in the image, wherein the randomized minor component is selected from a plurality of minor components based on the major component; and (b) recording the major component and the randomised minor component for said at least one pixel onto a transfer medium to thereby form a secure document, wherein at least said resolving step is performed by a processor.

17. A method for validating a recorded secure document, the method comprising the steps of:

(a) extracting, from a position in the recorded secure document, a retrieved pattern element;

(b) selecting a pattern element depending upon (bi) a characteristic of the retrieved pattern element and (bii) the position, wherein the pattern element is selected from a predetermined pattern which is selected from a plurality of predetermined patterns based upon the retrieved pattern element;

(c) comparing the retrieved pattern element and the selected pattern element to thereby determine if the recorded secure document has been tampered with wherein at least said selecting step and said comparing step are performed by a processor.

18. A method according to claim 17, comprising the further step of:

establishing that the characteristic at the position in the recorded document has been tampered with if the retrieved pattern element does not match the selected pattern element.

19. A method according to claim 17, wherein the characteristic is visible to a human reader of the document.

20. A method according to claim 17, wherein the selected pattern element is selected from a predetermined pattern which is a known sequence based on position.

21. A method according to claim 20, wherein the said predetermined pattern is a cipher field.

22. A method according to claim 21, wherein prior to the selection step the method comprises the further steps of:

(e) generating N cipher fields; and (f) aligning the cipher fields with the recorded image so that the position of the retrieved pattern element and a cipher field location can be related.

23. A method according to claim 22 wherein an alignment mark is recorded on the document and the alignment mark comprises at least two registration marks.

24. A method according to claim 22 wherein the alignment mark comprises at least one linear corrugated function.

25. A method according to claim 22, wherein the aligning in the step (f) further comprises block correlating the cipher fields with the recorded image.

26. A method for validating a recorded secure document, the method comprising the steps of:

(a) extracting, from the recorded secure document, a major component, having N possible values, for at least one recorded pixel;

(b) determining a corresponding randomised minor component depending upon (bi) the extracted major component and (bii) a position of the at least one recorded pixel;

(c) measuring, from the recorded secure document, the recorded randomised minor component for said at least one pixel; and (d) comparing the measured recorded randomised minor component and the determined randomised minor component, to thereby determine if the recorded secure document has been tampered with, wherein at least said determining step and said comparing step are performed by a processor.

27. A method according to claim 26, comprising the further step of:

establishing that the pixel of the recorded document has been tampered with if the measured recorded randomised minor component does not match the determined randomised minor component.

28. A tamper-evident document upon which is recorded an N-level image, the document comprising, in regard to at least one recorded pixel of the image, a recorded major component having N possible values, and a recorded randomised minor component, said recorded randomised minor component depending upon (a) the major component, and (b) a position of the at least one recorded pixel in the recorded document, wherein the randomized minor component is selected from a plurality of predetermined minor components based on the major component, and wherein at least the selection is performed by a processor.

29. A computer readable storage medium having a computer program recorded therein for directing a processor to execute the method recited in any one of claims 1, 4, 12, 16, 17 or 26.

* * * * *